United States Patent
McGhie et al.

(10) Patent No.: US 8,342,399 B1
(45) Date of Patent: *Jan. 1, 2013

(54) CONVERSION OF CREDITS TO FUNDS

(76) Inventors: Sean I. McGhie, Boca Raton, FL (US); Brian K. Buchheit, Davie, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,451

(22) Filed: Jul. 5, 2012

Related U.S. Application Data

(63) Continuation-in-part of application No. 11/420,255, filed on May 25, 2006, now Pat. No. 7,703,673, and a continuation-in-part of application No. 12/720,743, filed on Mar. 10, 2010, now Pat. No. 8,123,127, and a continuation-in-part of application No. 12/759,506, filed on Apr. 13, 2010, now Pat. No. 8,162,209, and a continuation-in-part of application No. 13/168,814, filed on Jun. 24, 2011.

(60) Provisional application No. 61/595,263, filed on Feb. 6, 2012, provisional application No. 61/595,351, filed on Feb. 6, 2012, provisional application No. 61/595,429, filed on Feb. 6, 2012.

(51) Int. Cl.
*G06K 5/00* (2006.01)
(52) U.S. Cl. ......... 235/380; 235/375; 235/379; 235/487
(58) Field of Classification Search .................. 235/380, 235/375, 379, 487, 486, 382; 705/14, 39
See application file for complete search history.

(56) References Cited

U.S. PATENT DOCUMENTS

| | | |
|---|---|---|
| 3,918,716 A | 11/1975 | Nonaka et al. |
| 4,087,660 A | 5/1978 | Sedley |
| 4,358,672 A | 11/1982 | Hyatt et al. |
| 4,473,825 A | 9/1984 | Walton |
| 4,518,098 A | 5/1985 | Fleischer |
| 4,546,241 A | 10/1985 | Walton |

(Continued)

FOREIGN PATENT DOCUMENTS
AU     6484498     11/1998

(Continued)

OTHER PUBLICATIONS

"At Sports Superstore Online, Shoppers Get More for Their Money; 10,000 Reasons to Shop at Sports Superstore Online", Business Wire Dec. 4, 1998, 2 pp.

(Continued)

*Primary Examiner* — Edwyn Labaze
(74) *Attorney, Agent, or Firm* — Patents of Demand P.A.; Brian K. Buchheit; Scott M. Garrett

(57) ABSTRACT

In one embodiment, non-negotiable credits from a user interaction with a credit providing entity can be identified. The credits can be associated with an entity with which a user has previously interacted. The previous interactions can earn the credits, which are non-negotiable credits. The credit providing entity can present the user with indicia indicating credit redemption opportunities. Responsive to a user request, a conversion agency can convert a quantity of the non-negotiable credits to a quantity of negotiable funds, wherein the conversion agency is not directly associated with the entity. The user can be permitted to access the quantity of negotiable funds, wherein the quantity of negotiable funds are able to be applied to user specified purchases, wherein at least a portion of the user specified purchases involve at least one vender that does not honor the non-negotiable credits.

50 Claims, 7 Drawing Sheets

U.S. PATENT DOCUMENTS

| | | |
|---|---|---|
| 4,582,324 A | 4/1986 | Koza et al. |
| 4,607,155 A | 8/1986 | Nao et al. |
| 4,609,812 A | 9/1986 | Drexler |
| 4,621,814 A | 11/1986 | Stephan et al. |
| 4,634,848 A | 1/1987 | Shinohara et al. |
| 4,689,742 A | 8/1987 | Troy et al. |
| 4,695,053 A | 9/1987 | Vazquez |
| 4,760,527 A | 7/1988 | Sidley |
| 4,764,666 A | 8/1988 | Bergeron |
| 4,882,473 A | 11/1989 | Bergeron |
| 4,910,672 A | 3/1990 | Off et al. |
| 4,941,090 A | 7/1990 | McCarthy |
| 4,942,090 A | 7/1990 | Morin |
| 4,968,873 A | 11/1990 | Dethloff |
| 5,025,372 A | 6/1991 | Burton et al. |
| 5,038,022 A | 8/1991 | Lucero |
| 5,056,019 A | 10/1991 | Schultz et al. |
| 5,080,364 A | 1/1992 | Seidman |
| 5,105,184 A | 4/1992 | Pirani et al. |
| 5,117,355 A | 5/1992 | McCarthy |
| 5,128,752 A | 7/1992 | Von Kohorn |
| 5,135,224 A | 8/1992 | Yamamoto |
| 5,173,851 A | 12/1992 | Off et al. |
| 5,179,517 A | 1/1993 | Sarbin et al. |
| 5,200,889 A | 4/1993 | Mori |
| 5,202,826 A | 4/1993 | McCarthy |
| 5,233,514 A | 8/1993 | Ayyoubi et al. |
| 5,237,620 A | 8/1993 | Deaton et al. |
| 5,256,863 A | 10/1993 | Ferguson et al. |
| 5,265,874 A | 11/1993 | Dickinson |
| 5,276,312 A | 1/1994 | McCarthy |
| 5,287,268 A | 2/1994 | McCarthy |
| 5,287,269 A | 2/1994 | Dorrough et al. |
| 5,290,033 A | 3/1994 | Bittner et al. |
| 5,305,196 A | 4/1994 | Deaton et al. |
| 5,327,508 A | 7/1994 | Deaton et al. |
| 5,332,076 A | 7/1994 | Ziegert |
| 5,344,144 A | 9/1994 | Canon |
| 5,353,218 A | 10/1994 | De Lapa et al. |
| 5,371,345 A | 12/1994 | LeStrange et al. |
| 5,373,440 A | 12/1994 | Cohen et al. |
| 5,382,779 A | 1/1995 | Gupta |
| 5,388,165 A | 2/1995 | Deaton et al. |
| 5,393,061 A | 2/1995 | Manship et al. |
| 5,397,125 A | 3/1995 | Adams |
| 5,398,932 A | 3/1995 | Eberhardt et al. |
| 5,402,872 A | 4/1995 | Clurman |
| 5,424,524 A | 6/1995 | Ruppert et al. |
| 5,429,361 A | 7/1995 | Raven |
| 5,430,644 A | 7/1995 | Deaton et al. |
| 5,434,394 A | 7/1995 | Roach et al. |
| 5,448,471 A | 9/1995 | Deaton et al. |
| 5,457,306 A | 10/1995 | Lucero |
| 5,467,269 A | 11/1995 | Flaten |
| 5,470,079 A | 11/1995 | LeStrange et al. |
| 5,471,669 A | 11/1995 | Lidman |
| 5,477,038 A | 12/1995 | Levine et al. |
| 5,483,444 A | 1/1996 | Heintzeman et al. |
| 5,491,326 A | 2/1996 | Marceau et al. |
| 5,502,636 A | 3/1996 | Clarke |
| 5,511,781 A | 4/1996 | Wood et al. |
| 5,513,102 A | 4/1996 | Auriemma |
| 5,535,407 A | 7/1996 | Yanagawa et al. |
| 5,537,314 A | 7/1996 | Kanter |
| 5,551,692 A | 9/1996 | Pettit et al. |
| 5,559,312 A | 9/1996 | Lucero |
| 5,559,313 A | 9/1996 | Claus et al. |
| 5,564,546 A | 10/1996 | Molbak et al. |
| 5,564,700 A | 10/1996 | Celona |
| 5,580,309 A | 12/1996 | Piechowiak |
| 5,586,936 A | 12/1996 | Bennett et al. |
| 5,592,560 A | 1/1997 | Deaton et al. |
| 5,609,337 A | 3/1997 | Clapper, Jr. |
| 5,612,868 A | 3/1997 | Off et al. |
| 5,613,912 A | 3/1997 | Slater |
| 5,621,812 A | 4/1997 | Deaton et al. |
| 5,635,696 A | 6/1997 | Dabrowski |
| 5,638,457 A | 6/1997 | Deaton et al. |
| 5,642,485 A | 6/1997 | Deaton et al. |
| 5,643,088 A | 7/1997 | Vaughn et al. |
| 5,644,723 A | 7/1997 | Deaton et al. |
| 5,649,114 A | 7/1997 | Deaton et al. |
| 5,649,115 A | 7/1997 | Schrader et al. |
| 5,655,961 A | 8/1997 | Acres et al. |
| 5,659,469 A | 8/1997 | Deaton et al. |
| 5,672,109 A | 9/1997 | Natanian |
| 5,673,322 A | 9/1997 | Pepe et al. |
| 5,674,123 A | 10/1997 | Roberson, Jr. et al. |
| 5,675,662 A | 10/1997 | Deaton et al. |
| 5,677,952 A | 10/1997 | Blakley, III et al. |
| 5,687,322 A | 11/1997 | Deaton et al. |
| 5,689,100 A | 11/1997 | Carrithers |
| 5,697,611 A | 12/1997 | Kelly et al. |
| 5,708,782 A | 1/1998 | Larson et al. |
| 5,710,886 A | 1/1998 | Christensen et al. |
| 5,715,399 A | 2/1998 | Bezoz |
| 5,725,428 A | 3/1998 | Achmuller |
| 5,729,693 A | 3/1998 | Holda-Fleck |
| 5,734,838 A | 3/1998 | Robinson et al. |
| 5,741,183 A | 4/1998 | Acres |
| 5,742,845 A | 4/1998 | Wagner |
| 5,749,075 A | 5/1998 | Toader et al. |
| 5,754,655 A | 5/1998 | Hughes |
| 5,761,647 A | 6/1998 | Boushy |
| 5,761,648 A | 6/1998 | Golden et al. |
| 5,765,141 A | 6/1998 | Spector |
| 5,766,075 A | 6/1998 | Cook et al. |
| 5,769,716 A | 6/1998 | Saffari et al. |
| 5,770,533 A | 6/1998 | Franchi |
| 5,774,868 A | 6/1998 | Cragun et al. |
| 5,774,869 A | 6/1998 | Toader |
| 5,774,870 A | 6/1998 | Storey |
| 5,779,549 A | 7/1998 | Walker et al. |
| 5,794,230 A | 8/1998 | Horadan et al. |
| 5,802,275 A | 9/1998 | Blonder |
| 5,806,043 A | 9/1998 | Toader |
| 5,806,044 A | 9/1998 | Powell |
| 5,806,045 A | 9/1998 | Biorge et al. |
| 5,809,482 A | 9/1998 | Strisower |
| 5,814,796 A | 9/1998 | Benson et al. |
| 5,816,918 A | 10/1998 | Kelly et al. |
| 5,820,460 A | 10/1998 | Fulton |
| 5,822,230 A | 10/1998 | Kikinis et al. |
| 5,823,874 A | 10/1998 | Adams |
| 5,832,457 A | 11/1998 | O'Brien et al. |
| 5,832,458 A | 11/1998 | Jones |
| 5,833,536 A | 11/1998 | Davids et al. |
| 5,834,748 A | 11/1998 | Litman |
| 5,836,817 A | 11/1998 | Acres |
| 5,839,117 A | 11/1998 | Cameron et al. |
| 5,844,230 A | 12/1998 | Lalonde |
| 5,845,259 A | 12/1998 | West et al. |
| 5,848,399 A | 12/1998 | Burke |
| 5,851,148 A | 12/1998 | Brune et al. |
| 5,855,007 A | 12/1998 | Jovicic et al. |
| D404,436 S | 1/1999 | McGahn et al. |
| 5,857,175 A | 1/1999 | Day et al. |
| 5,864,822 A | 1/1999 | Baker, III |
| RE36,116 E | 2/1999 | McCarthy |
| 5,870,722 A | 2/1999 | Albert et al. |
| 5,876,284 A | 3/1999 | Acres et al. |
| 5,882,261 A | 3/1999 | Adams |
| 5,882,262 A | 3/1999 | Balhorn |
| 5,884,277 A | 3/1999 | Khosla |
| 5,892,827 A | 4/1999 | Beach et al. |
| 5,892,900 A | 4/1999 | Ginter et al. |
| 5,892,905 A | 4/1999 | Brandt et al. |
| 5,898,838 A | 4/1999 | Wagner |
| 5,902,184 A | 5/1999 | Bennett |
| 5,902,983 A | 5/1999 | Crevelt et al. |
| 5,903,874 A | 5/1999 | Leonard et al. |
| 5,903,880 A | 5/1999 | Biffar |
| 5,905,246 A | 5/1999 | Fajkowski |
| 5,905,908 A | 5/1999 | Wagner |
| 5,907,830 A | 5/1999 | Engel et al. |
| 5,907,831 A | 5/1999 | Lotvin et al. |
| 5,909,023 A | 6/1999 | Ono et al. |

| Patent No. | Date | Inventor |
|---|---|---|
| 5,909,486 A | 6/1999 | Walker et al. |
| 5,911,418 A | 6/1999 | Adams |
| 5,913,210 A | 6/1999 | Call |
| 5,915,007 A | 6/1999 | Klapka |
| 5,915,019 A | 6/1999 | Ginter et al. |
| 5,915,243 A | 6/1999 | Smolen |
| 5,915,244 A | 6/1999 | Jack et al. |
| 5,918,211 A | 6/1999 | Sloane |
| 5,918,213 A | 6/1999 | Bernard et al. |
| 5,918,214 A | 6/1999 | Perkowski |
| 5,919,091 A | 7/1999 | Bell |
| 5,920,847 A | 7/1999 | Kolling et al. |
| 5,923,016 A | 7/1999 | Fredregill et al. |
| 5,933,811 A | 8/1999 | Angles et al. |
| 5,935,000 A | 8/1999 | Sanchez, III |
| 5,937,391 A | 8/1999 | Ikeda et al. |
| 5,937,394 A | 8/1999 | Wong et al. |
| 5,938,727 A | 8/1999 | Ikeda |
| 5,940,506 A | 8/1999 | Chang et al. |
| 5,941,771 A | 8/1999 | Haste, III |
| 5,941,772 A | 8/1999 | Paige |
| 5,943,241 A | 8/1999 | Nichols et al. |
| 5,946,664 A | 8/1999 | Ebisawa |
| 5,947,820 A | 9/1999 | Morro et al. |
| 5,949,042 A | 9/1999 | Dietz, II et al. |
| 5,950,173 A | 9/1999 | Perkowski |
| 5,951,397 A | 9/1999 | Dickinson |
| 5,952,638 A | 9/1999 | Demers et al. |
| 5,953,005 A | 9/1999 | Liu |
| 5,956,038 A | 9/1999 | Rekimoto |
| 5,956,695 A | 9/1999 | Carrithers et al. |
| 5,956,700 A | 9/1999 | Landry |
| 5,959,277 A | 9/1999 | Lucero |
| 5,967,896 A | 10/1999 | Jorasch et al. |
| 5,970,469 A | 10/1999 | Scroggie et al. |
| 5,970,470 A | 10/1999 | Walker |
| 5,971,277 A | 10/1999 | Cragun et al. |
| 5,974,135 A | 10/1999 | Breneman et al. |
| 5,974,398 A | 10/1999 | Hanson et al. |
| 5,978,777 A | 11/1999 | Garnier |
| 5,979,757 A | 11/1999 | Tracy et al. |
| 5,980,385 A | 11/1999 | Clapper |
| 5,982,520 A | 11/1999 | Weiser et al. |
| 5,983,196 A | 11/1999 | Wendkos |
| 5,983,205 A | 11/1999 | Brams et al. |
| 5,984,191 A | 11/1999 | Chapin, Jr. |
| 5,988,500 A | 11/1999 | Litman |
| 5,991,376 A | 11/1999 | Hennessy et al. |
| 5,991,736 A | 11/1999 | Ferguson et al. |
| 5,992,738 A | 11/1999 | Matsumoto et al. |
| 5,992,752 A | 11/1999 | Wilz, Sr. et al. |
| 5,993,316 A | 11/1999 | Coyle |
| 5,995,942 A | 11/1999 | Smith et al. |
| 5,999,624 A | 12/1999 | Hopkins |
| 5,999,914 A | 12/1999 | Blinn et al. |
| 6,000,608 A | 12/1999 | Dorf |
| 6,002,771 A | 12/1999 | Nielsen |
| 6,003,013 A | 12/1999 | Boushy et al. |
| 6,007,426 A | 12/1999 | Kelly et al. |
| 6,009,411 A | 12/1999 | Kepecs |
| 6,009,412 A | 12/1999 | Storey |
| 6,009,458 A | 12/1999 | Hawkins |
| 6,012,039 A | 1/2000 | Hoffman et al. |
| 6,012,051 A | 1/2000 | Sammon, Jr. et al. |
| 6,012,636 A | 1/2000 | Smith |
| 6,014,594 A | 1/2000 | Heidel |
| 6,014,634 A | 1/2000 | Scroggie et al. |
| 6,014,635 A | 1/2000 | Harris et al. |
| 6,015,344 A | 1/2000 | Kelly et al. |
| 6,016,476 A | 1/2000 | Maes et al. |
| 6,018,695 A | 1/2000 | Ahrens et al. |
| 6,018,718 A | 1/2000 | Walker et al. |
| 6,018,724 A | 1/2000 | Arent |
| 6,021,399 A | 2/2000 | Demers et al. |
| 6,024,640 A | 2/2000 | Walker et al. |
| 6,026,370 A | 2/2000 | Jermyn |
| 6,026,375 A | 2/2000 | Hall et al. |
| 6,026,377 A | 2/2000 | Burke |
| 6,032,133 A | 2/2000 | Hilt et al. |
| 6,032,136 A | 2/2000 | Brake, Jr. et al. |
| 6,032,955 A | 3/2000 | Luciano et al. |
| 6,035,280 A | 3/2000 | Christensen |
| 6,035,281 A | 3/2000 | Crosskey et al. |
| 6,036,601 A | 3/2000 | Heckel |
| 6,038,321 A | 3/2000 | Torigai et al. |
| 6,039,244 A | 3/2000 | Finsterwald |
| 6,039,648 A | 3/2000 | Guinn |
| 6,041,308 A | 3/2000 | Walker et al. |
| 6,041,309 A | 3/2000 | Laor |
| 6,044,360 A | 3/2000 | Picciallo |
| 6,047,269 A | 4/2000 | Biffar |
| 6,048,269 A | 4/2000 | Burns et al. |
| 6,049,778 A | 4/2000 | Walker et al. |
| 6,049,779 A | 4/2000 | Berkson |
| 6,055,573 A | 4/2000 | Gardenswartz et al. |
| 6,058,371 A | 5/2000 | Dijan |
| 6,058,482 A | 5/2000 | Liu |
| 6,061,660 A | 5/2000 | Eggleston et al. |
| 6,062,980 A | 5/2000 | Luciano |
| 6,064,979 A | 5/2000 | Perkowski |
| 6,064,987 A | 5/2000 | Walker |
| 6,065,120 A | 5/2000 | Laursen et al. |
| 6,068,553 A | 5/2000 | Parker |
| 6,072,468 A | 6/2000 | Hocker et al. |
| 6,073,840 A | 6/2000 | Marion |
| 6,075,863 A | 6/2000 | Krishnan et al. |
| 6,076,101 A | 6/2000 | Kamakura et al. |
| 6,078,898 A | 6/2000 | Davis et al. |
| 6,081,900 A | 6/2000 | Subramaniam et al. |
| 6,088,730 A | 7/2000 | Kato et al. |
| 6,089,982 A | 7/2000 | Holch |
| 6,092,069 A | 7/2000 | Johnson et al. |
| 6,092,201 A | 7/2000 | Turnbull et al. |
| 6,094,486 A | 7/2000 | Marchant |
| 6,098,837 A | 8/2000 | Izawa |
| 6,101,483 A | 8/2000 | Petrovich et al. |
| 6,101,484 A | 8/2000 | Halbert et al. |
| 6,101,485 A | 8/2000 | Fortenberry et al. |
| 6,105,001 A | 8/2000 | Masi et al. |
| 6,105,865 A | 8/2000 | Hardesty |
| 6,110,041 A | 8/2000 | Walker et al. |
| 6,110,042 A | 8/2000 | Walker et al. |
| 6,113,098 A | 9/2000 | Adams |
| 6,113,495 A | 9/2000 | Walker et al. |
| 6,115,737 A | 9/2000 | Ely et al. |
| 6,119,229 A | 9/2000 | Martinez |
| 6,119,230 A | 9/2000 | Carter |
| 6,124,947 A | 9/2000 | Seo |
| 6,128,599 A | 10/2000 | Walker et al. |
| 6,128,603 A | 10/2000 | Dent et al. |
| 6,129,274 A | 10/2000 | Suzuki |
| 6,131,810 A | 10/2000 | Weiss et al. |
| 6,134,318 A | 10/2000 | O'Neil |
| 6,134,548 A | 10/2000 | Gottsman et al. |
| 6,138,911 A | 10/2000 | Fredregill et al. |
| 6,139,431 A | 10/2000 | Walker et al. |
| 6,141,161 A | 10/2000 | Sato et al. |
| 6,141,653 A | 10/2000 | Conklin |
| 6,141,684 A | 10/2000 | McDonald et al. |
| 6,145,739 A | 11/2000 | Bertina et al. |
| 6,148,405 A | 11/2000 | Liao et al. |
| 6,154,214 A | 11/2000 | Uyehara et al. |
| 6,161,096 A | 12/2000 | Bell |
| 6,162,122 A | 12/2000 | Acres |
| 6,164,533 A | 12/2000 | Barton |
| 6,165,071 A | 12/2000 | Weiss |
| 6,168,522 B1 | 1/2001 | Walker |
| 6,173,267 B1 | 1/2001 | Cairns |
| 6,178,407 B1 | 1/2001 | Lotvin et al. |
| 6,178,408 B1 | 1/2001 | Copple et al. |
| 6,182,894 B1 | 2/2001 | Hackett et al. |
| 6,183,362 B1 | 2/2001 | Boushy |
| 6,183,366 B1 | 2/2001 | Goldberg et al. |
| 6,185,541 B1 | 2/2001 | Scroggie et al. |
| 6,186,893 B1 | 2/2001 | Walker et al. |
| 6,186,894 B1 | 2/2001 | Mayeroff |
| 6,189,103 B1 | 2/2001 | Nevarez et al. |
| 6,193,608 B1 | 2/2001 | Walker et al. |

| | | |
|---|---|---|
| 6,195,677 B1 | 2/2001 | Utsumi |
| 6,196,458 B1 | 3/2001 | Walker et al. |
| 6,199,099 B1 | 3/2001 | Gershman et al. |
| 6,216,129 B1 | 4/2001 | Eldering |
| 6,222,914 B1 | 4/2001 | McMullin |
| 6,224,483 B1 | 5/2001 | Mayeroff |
| 6,227,972 B1 | 5/2001 | Walker et al. |
| 6,229,533 B1 | 5/2001 | Farmer |
| 6,231,442 B1 | 5/2001 | Mayeroff |
| 6,234,896 B1 | 5/2001 | Walker et al. |
| 6,236,978 B1 | 5/2001 | Tuzhilin |
| 6,243,688 B1 | 6/2001 | Kalina |
| 6,244,958 B1 | 6/2001 | Acres |
| 6,249,773 B1 | 6/2001 | Allard et al. |
| 6,267,671 B1 | 7/2001 | Hogan |
| 6,273,820 B1 | 8/2001 | Haste, III |
| 6,280,326 B1 | 8/2001 | Saunders |
| 6,280,328 B1 | 8/2001 | Holch |
| 6,289,261 B1 | 9/2001 | Heidel |
| 6,289,322 B1 | 9/2001 | Kitchen et al. |
| 6,292,786 B1 | 9/2001 | Deaton et al. |
| 6,293,865 B1 | 9/2001 | Kelly et al. |
| 6,293,866 B1 | 9/2001 | Walker et al. |
| 6,293,867 B1 | 9/2001 | Heidel |
| 6,298,335 B1 | 10/2001 | Bernstein |
| 6,302,793 B1 | 10/2001 | Fertitta, III |
| 6,306,035 B1 | 10/2001 | Kelly et al. |
| 6,311,976 B1 | 11/2001 | Yoseloff et al. |
| 6,312,333 B1 | 11/2001 | Acres |
| 6,315,665 B1 | 11/2001 | Faith |
| 6,319,125 B1 | 11/2001 | Acres |
| 6,327,573 B1 | 12/2001 | Walker et al. |
| 6,332,099 B1 | 12/2001 | Heidel |
| 6,332,157 B1 | 12/2001 | Mighdoli et al. |
| 6,341,353 B1 | 1/2002 | Herman |
| 6,345,261 B1 | 2/2002 | Feidelson et al. |
| 6,352,175 B2 | 3/2002 | Izawa |
| 6,358,149 B1 | 3/2002 | Schneider et al. |
| 6,363,362 B1 | 3/2002 | Burfield et al. |
| 6,379,247 B1 | 4/2002 | Walker et al. |
| 6,394,907 B1 | 5/2002 | Rowe |
| 6,402,029 B1 | 6/2002 | Gangi |
| 6,408,284 B1 | 6/2002 | Hill et al. |
| 6,431,983 B2 | 8/2002 | Acres |
| 6,438,527 B1 | 8/2002 | Powar |
| 6,452,498 B2 | 9/2002 | Stewart |
| 6,476,830 B1 | 11/2002 | Farmer |
| 6,484,940 B1 | 11/2002 | Dilday et al. |
| 6,486,788 B1 | 11/2002 | Zagone et al. |
| 6,491,584 B2 | 12/2002 | Graham |
| 6,505,772 B1 | 1/2003 | Mollett et al. |
| 6,510,998 B1 | 1/2003 | Stanford et al. |
| 6,511,377 B1 | 1/2003 | Weiss |
| 6,522,889 B1 | 2/2003 | Aarnio |
| 6,533,664 B1 | 3/2003 | Crumby |
| 6,547,131 B1 | 4/2003 | Foodman |
| 6,549,912 B1 | 4/2003 | Chen |
| 6,554,705 B1 | 4/2003 | Cumbers |
| 6,572,471 B1 | 6/2003 | Bennett |
| 6,575,832 B1 | 6/2003 | Manfredi et al. |
| 6,578,015 B1 | 6/2003 | Haseltine et al. |
| 6,579,179 B2 | 6/2003 | Poole et al. |
| 6,601,040 B1 | 7/2003 | Kolls |
| 6,607,441 B1 | 8/2003 | Acres |
| 6,609,150 B2 | 8/2003 | Lee et al. |
| 6,609,969 B1 | 8/2003 | Luciano |
| 6,609,970 B1 | 8/2003 | Luciano |
| 6,609,978 B1 | 8/2003 | Paulsen |
| 6,623,357 B2 | 9/2003 | Chowdhury |
| 6,631,358 B1 | 10/2003 | Ogilvie |
| 6,631,849 B2 | 10/2003 | Blossom |
| 6,645,077 B2 | 11/2003 | Rowe |
| 6,648,755 B1 | 11/2003 | Luciano, Jr. |
| 6,656,050 B2 | 12/2003 | Busch |
| 6,685,559 B2 | 2/2004 | Luciano |
| 6,687,679 B1 | 2/2004 | Van Luchene et al. |
| 6,721,743 B1 | 4/2004 | Sakakibara |
| 6,748,365 B1 | 6/2004 | Quinlan et al. |
| 6,800,029 B2 | 10/2004 | Rowe |
| 6,813,609 B2 | 11/2004 | Wilson |
| 6,820,061 B2 | 11/2004 | Postrel |
| 6,826,594 B1 | 11/2004 | Pettersen |
| 6,829,586 B2 | 12/2004 | Postrel |
| 6,842,739 B2 | 1/2005 | Postrel |
| 6,843,720 B2 | 1/2005 | Luciano |
| 6,846,238 B2 | 1/2005 | Wells |
| 6,852,031 B1 | 2/2005 | Rowe |
| 6,856,976 B2 | 2/2005 | Bible et al. |
| 6,866,586 B2 | 3/2005 | Oberberger |
| 6,898,570 B1 | 5/2005 | Tedesco et al. |
| 6,915,271 B1 | 7/2005 | Meyer et al. |
| 6,920,611 B1 | 7/2005 | Spaeth et al. |
| 6,929,550 B2 | 8/2005 | Hisada |
| 6,931,538 B1 | 8/2005 | Sawaguchi |
| 6,947,898 B2 | 9/2005 | Postrel |
| 6,951,302 B2 | 10/2005 | Potts |
| 6,985,876 B1 | 1/2006 | Lee |
| 6,997,807 B2 | 2/2006 | Weiss |
| 7,003,496 B2 | 2/2006 | Ishii |
| 7,025,674 B2 | 4/2006 | Adams et al. |
| 7,043,752 B2 | 5/2006 | Royer et al. |
| 7,072,864 B2 | 7/2006 | Brake, Jr. et al. |
| 7,096,190 B2 | 8/2006 | Postrel |
| 7,127,414 B1 | 10/2006 | Awadallah et al. |
| 7,128,652 B1 | 10/2006 | Lavoie |
| 7,130,828 B2 | 10/2006 | Phillips et al. |
| 7,134,959 B2 | 11/2006 | Penrice |
| 7,137,883 B1 | 11/2006 | Falciglia |
| 7,146,342 B1 | 12/2006 | Angelin |
| 7,168,089 B2 | 1/2007 | Nguyen |
| 7,174,315 B2 | 2/2007 | Phillips et al. |
| 7,187,947 B1 | 3/2007 | White et al. |
| 7,200,571 B1 | 4/2007 | Jenniges et al. |
| 7,249,139 B2 | 7/2007 | Chuah |
| 7,249,197 B1 | 7/2007 | Roestenburg et al. |
| 7,289,970 B1 | 10/2007 | Siegel |
| 7,290,061 B2 | 10/2007 | Lentini et al. |
| 7,291,064 B2 | 11/2007 | Yamada |
| 7,321,901 B1 | 1/2008 | Blinn et al. |
| 7,349,867 B2 | 3/2008 | Rollins et al. |
| 7,360,693 B1 | 4/2008 | Sullivan |
| 7,387,571 B2 | 6/2008 | Walker |
| 7,390,264 B2 | 6/2008 | Walker |
| 7,398,226 B2 | 7/2008 | Haines et al. |
| 7,455,586 B2 | 11/2008 | Nguyen |
| 7,613,629 B2 | 11/2009 | Antonucci et al. |
| 7,641,547 B2 | 1/2010 | Walker et al. |
| 7,680,688 B2 | 3/2010 | Hessburg |
| 7,703,673 B2 | 4/2010 | Buchheit et al. |
| 7,747,463 B1 | 6/2010 | Phillips et al. |
| 7,765,124 B2 | 7/2010 | Postrel |
| 7,827,056 B2 | 11/2010 | Walker et al. |
| 7,827,057 B1 | 11/2010 | Walker et al. |
| 7,828,206 B2 | 11/2010 | Hessburg et al. |
| 7,856,376 B2 | 12/2010 | Storey |
| 8,046,256 B2 | 10/2011 | Chien et al. |
| 8,062,116 B2 | 11/2011 | Lutnick et al. |
| 8,100,758 B2 | 1/2012 | Walker et al. |
| 8,123,127 B2 | 2/2012 | McGhie et al. |
| 8,162,209 B2 | 4/2012 | Buchheit et al. |
| 8,181,863 B2 | 5/2012 | McGhie et al. |
| 8,181,864 B1 | 5/2012 | McGhie et al. |
| 8,186,583 B1 | 5/2012 | McGhie et al. |
| 8,201,734 B1 | 6/2012 | McGhie et al. |
| 8,234,164 B2 | 7/2012 | Walker et al. |
| 8,245,925 B2 | 8/2012 | McGhie et al. |
| 8,267,315 B1 | 9/2012 | McGhie et al. |
| 2001/0032137 A1 | 10/2001 | Bennett et al. |
| 2001/0032182 A1 | 10/2001 | Kumar et al. |
| 2001/0032183 A1 | 10/2001 | Landry |
| 2001/0034259 A1 | 10/2001 | Luciano et al. |
| 2001/0034649 A1 | 10/2001 | Acres |
| 2001/0034653 A1 | 10/2001 | Yamamoto |
| 2001/0034720 A1 | 10/2001 | Armes |
| 2001/0037295 A1 | 11/2001 | Olsen |
| 2001/0041610 A1 | 11/2001 | Luciano et al. |
| 2001/0044337 A1 | 11/2001 | Rowe |
| 2001/0046891 A1 | 11/2001 | Acres |

| | | |
|---|---|---|
| 2001/0047342 A1 | 11/2001 | Cuervo |
| 2001/0054003 A1 | 12/2001 | Chien et al. |
| 2002/0002075 A1 | 1/2002 | Rowe |
| 2002/0002532 A1 | 1/2002 | Tso |
| 2002/0002538 A1 | 1/2002 | Ling |
| 2002/0010025 A1 | 1/2002 | Kelly et al. |
| 2002/0013728 A1 | 1/2002 | Wilkman |
| 2002/0013767 A1 | 1/2002 | Katz |
| 2002/0016734 A1 | 2/2002 | McGill et al. |
| 2002/0020965 A1 | 2/2002 | Potter |
| 2002/0026348 A1 | 2/2002 | Fowler et al. |
| 2002/0039923 A1 | 4/2002 | Cannon |
| 2002/0045476 A1 | 4/2002 | Poole |
| 2002/0046110 A1 | 4/2002 | Gallagher |
| 2002/0049631 A1 | 4/2002 | Williams |
| 2002/0052940 A1 | 5/2002 | Myers et al. |
| 2002/0055874 A1 | 5/2002 | Cohen |
| 2002/0056044 A1 | 5/2002 | Andersson |
| 2002/0062253 A1 | 5/2002 | Dosh et al. |
| 2002/0065126 A1 | 5/2002 | Miller et al. |
| 2002/0068624 A1 | 6/2002 | Ellis |
| 2002/0069109 A1 | 6/2002 | Wendkos |
| 2002/0069150 A1 | 6/2002 | Ni |
| 2002/0072412 A1 | 6/2002 | Young |
| 2002/0075844 A1 | 6/2002 | Hagen |
| 2002/0077173 A1 | 6/2002 | Luciano et al. |
| 2002/0077890 A1 | 6/2002 | LaPointe et al. |
| 2002/0077978 A1 | 6/2002 | O'Leary et al. |
| 2002/0082918 A1 | 6/2002 | Warwick |
| 2002/0082920 A1 | 6/2002 | Austin |
| 2002/0082990 A1 | 6/2002 | Jones |
| 2002/0086733 A1 | 7/2002 | Wang |
| 2002/0087468 A1 | 7/2002 | Ganesan et al. |
| 2002/0091593 A1 | 7/2002 | Fowler |
| 2002/0095365 A1 | 7/2002 | Slavin et al. |
| 2002/0107072 A1 | 8/2002 | Giobbi |
| 2002/0107733 A1 | 8/2002 | Liu et al. |
| 2002/0111210 A1 | 8/2002 | Luciano, Jr. |
| 2002/0111907 A1 | 8/2002 | Ling |
| 2002/0111919 A1 | 8/2002 | Weller et al. |
| 2002/0116257 A1 | 8/2002 | Helbig |
| 2002/0120513 A1 | 8/2002 | Webb et al. |
| 2002/0123949 A1 | 9/2002 | VanLeeuwen |
| 2002/0143614 A1 | 10/2002 | MacLean et al. |
| 2002/0146018 A1 | 10/2002 | Kailamaki et al. |
| 2002/0147047 A1 | 10/2002 | Letovsky |
| 2002/0152116 A1 | 10/2002 | Yan |
| 2002/0160838 A1 | 10/2002 | Kim |
| 2002/0161630 A1 | 10/2002 | Kern et al. |
| 2002/0169021 A1 | 11/2002 | Urie |
| 2002/0169660 A1 | 11/2002 | Taylor et al. |
| 2002/0177479 A1 | 11/2002 | Walker |
| 2002/0194069 A1 | 12/2002 | Thakur et al. |
| 2002/0198043 A1 | 12/2002 | Chowdhury |
| 2003/0003996 A1 | 1/2003 | Nguyen |
| 2003/0004802 A1 | 1/2003 | Callegari |
| 2003/0004808 A1 | 1/2003 | Elhaossine et al. |
| 2003/0008707 A1 | 1/2003 | Walker et al. |
| 2003/0009379 A1 | 1/2003 | Narasimhan et al. |
| 2003/0013438 A1 | 1/2003 | Darby |
| 2003/0018523 A1 | 1/2003 | Rappaport et al. |
| 2003/0033534 A1 | 2/2003 | Rand |
| 2003/0036425 A1 | 2/2003 | Kaminkow et al. |
| 2003/0040964 A1 | 2/2003 | Lacek |
| 2003/0045353 A1 | 3/2003 | Paulsen |
| 2003/0050831 A1 | 3/2003 | Klayh |
| 2003/0055722 A1 | 3/2003 | Perreault et al. |
| 2003/0055780 A1 | 3/2003 | Hansen et al. |
| 2003/0060264 A1 | 3/2003 | Chilton |
| 2003/0061097 A1 | 3/2003 | Walker |
| 2003/0062242 A1 | 4/2003 | Hallowell et al. |
| 2003/0069787 A1 | 4/2003 | Tendon et al. |
| 2003/0069842 A1 | 4/2003 | Kight et al. |
| 2003/0074311 A1 | 4/2003 | Saylors et al. |
| 2003/0078094 A1 | 4/2003 | Gatto |
| 2003/0083943 A1 | 5/2003 | Adams et al. |
| 2003/0087650 A1 | 5/2003 | Aarnio |
| 2003/0087692 A1 | 5/2003 | Weiss |
| 2003/0101131 A1 | 5/2003 | Warren et al. |
| 2003/0104862 A1 | 6/2003 | Acres |
| 2003/0104865 A1 | 6/2003 | Itkis |
| 2003/0106769 A1 | 6/2003 | Weiss |
| 2003/0115456 A1 | 6/2003 | Kapoor |
| 2003/0130948 A1 | 7/2003 | Algiene et al. |
| 2003/0148807 A1 | 8/2003 | Acres |
| 2003/0163425 A1 | 8/2003 | Cannon, Jr. |
| 2003/0182218 A1 | 9/2003 | Blagg |
| 2003/0186747 A1 | 10/2003 | Nguyen |
| 2003/0187762 A1 | 10/2003 | Coyle |
| 2003/0200142 A1 | 10/2003 | Hicks et al. |
| 2003/0200144 A1 | 10/2003 | Antonucci et al. |
| 2003/0208445 A1 | 11/2003 | Compiano |
| 2003/0211883 A1 | 11/2003 | Potts |
| 2003/0216960 A1 | 11/2003 | Postrel |
| 2003/0216967 A1 | 11/2003 | Williams |
| 2003/0228902 A1 | 12/2003 | Walker |
| 2003/0229584 A1 | 12/2003 | Brown |
| 2003/0236749 A1 | 12/2003 | Shergalis |
| 2004/0002369 A1 | 1/2004 | Walker et al. |
| 2004/0006531 A1 | 1/2004 | Kwan |
| 2004/0015438 A1 | 1/2004 | Compiano et al. |
| 2004/0019522 A1 | 1/2004 | Bortolin |
| 2004/0019560 A1 | 1/2004 | Evans et al. |
| 2004/0035923 A1 | 2/2004 | Kahr |
| 2004/0039644 A1 | 2/2004 | Postrel |
| 2004/0039692 A1 | 2/2004 | Shields et al. |
| 2004/0043806 A1 | 3/2004 | Kirby |
| 2004/0048658 A1 | 3/2004 | Sanders |
| 2004/0049439 A1 | 3/2004 | Johnston et al. |
| 2004/0053693 A1 | 3/2004 | An |
| 2004/0068438 A1 | 4/2004 | Mitchell |
| 2004/0078273 A1 | 4/2004 | Loeb et al. |
| 2004/0097287 A1 | 5/2004 | Postrel |
| 2004/0098317 A1 | 5/2004 | Postrel |
| 2004/0107140 A1 | 6/2004 | Postrel |
| 2004/0111346 A1 | 6/2004 | Macbeath |
| 2004/0111366 A1 | 6/2004 | Schneider |
| 2004/0128197 A1 | 7/2004 | Bam |
| 2004/0143500 A1 | 7/2004 | Lopez et al. |
| 2004/0143501 A1 | 7/2004 | Lopez |
| 2004/0158492 A1 | 8/2004 | Lopez |
| 2004/0173673 A1 | 9/2004 | Potts |
| 2004/0215505 A1 | 10/2004 | Sullivan |
| 2004/0220854 A1 | 11/2004 | Postrel |
| 2004/0229671 A1 | 11/2004 | Stronach |
| 2004/0262381 A1 | 12/2004 | Mesaros |
| 2005/0015332 A1 | 1/2005 | Chen |
| 2005/0021399 A1 | 1/2005 | Postrel |
| 2005/0021400 A1 | 1/2005 | Postrel |
| 2005/0021401 A1 | 1/2005 | Postrel |
| 2005/0021457 A1 | 1/2005 | Johnston et al. |
| 2005/0043082 A1 | 2/2005 | Peterson |
| 2005/0060225 A1 | 3/2005 | Postrel |
| 2005/0080727 A1 | 4/2005 | Postrel |
| 2005/0080728 A1 | 4/2005 | Sobek |
| 2005/0096124 A1 | 5/2005 | Stronach |
| 2005/0107155 A1 | 5/2005 | Potts et al. |
| 2005/0137015 A1 | 6/2005 | Rogers |
| 2005/0143174 A1 | 6/2005 | Goldman |
| 2005/0149394 A1 | 7/2005 | Postrel |
| 2005/0177428 A1 | 8/2005 | Ganz |
| 2005/0177519 A1 | 8/2005 | Block |
| 2005/0182693 A1 | 8/2005 | Alivandi |
| 2005/0192864 A1 | 9/2005 | Ganz |
| 2005/0240472 A1 | 10/2005 | Postrel |
| 2005/0250415 A1 | 11/2005 | Barthold |
| 2005/0261056 A1 | 11/2005 | Smolucha |
| 2006/0004629 A1 | 1/2006 | Neemann et al. |
| 2006/0020511 A1 | 1/2006 | Postrel |
| 2006/0035692 A1 | 2/2006 | Kirby |
| 2006/0046827 A1 | 3/2006 | Saffari et al. |
| 2006/0052150 A1 | 3/2006 | Hedrick et al. |
| 2006/0063580 A1 | 3/2006 | Nguyen |
| 2006/0079150 A1 | 4/2006 | Filoseta |
| 2006/0100018 A1 | 5/2006 | Ganz |
| 2006/0148559 A1 | 7/2006 | Jordan |
| 2006/0178217 A1 | 8/2006 | Jung |
| 2006/0178899 A1 | 8/2006 | Jung |

| | | | |
|---|---|---|---|
| 2006/0178964 | A1 | 8/2006 | Jung |
| 2006/0178965 | A1 | 8/2006 | Jung |
| 2006/0178966 | A1 | 8/2006 | Jung |
| 2006/0178967 | A1 | 8/2006 | Jung |
| 2006/0178968 | A1 | 8/2006 | Jung |
| 2006/0178970 | A1 | 8/2006 | Jung |
| 2006/0178972 | A1 | 8/2006 | Jung |
| 2006/0178975 | A1 | 8/2006 | Jung |
| 2006/0178985 | A1 | 8/2006 | Jung |
| 2006/0195376 | A1 | 8/2006 | Jung |
| 2006/0195377 | A1 | 8/2006 | Jung |
| 2006/0195378 | A1 | 8/2006 | Jung |
| 2006/0195394 | A1 | 8/2006 | Jung |
| 2006/0205481 | A1 | 9/2006 | Dominelli |
| 2006/0224505 | A1 | 10/2006 | Jung |
| 2006/0229976 | A1 | 10/2006 | Jung |
| 2007/0073582 | A1 | 3/2007 | Jung |
| 2007/0087822 | A1 | 4/2007 | Van Luchene |
| 2007/0167218 | A1 | 7/2007 | Rothschild |
| 2007/0168266 | A1 | 7/2007 | Questembert |
| 2007/0239523 | A1 | 10/2007 | Yi |
| 2008/0086759 | A1 | 4/2008 | Colson |
| 2009/0023490 | A1 | 1/2009 | Moshal et al. |
| 2010/0174600 | A1 | 7/2010 | Walker |
| 2010/0227675 | A1 | 9/2010 | Luxton et al. |
| 2010/0248823 | A1 | 9/2010 | Smith |
| 2011/0151976 | A1 | 6/2011 | Holloway |
| 2011/0183749 | A1 | 7/2011 | Allen |
| 2011/0207525 | A1 | 8/2011 | Allen |
| 2011/0256924 | A1 | 10/2011 | McGhie et al. |
| 2011/0275432 | A1 | 11/2011 | Lutnick et al. |
| 2012/0041810 | A1 | 2/2012 | Hofer |

FOREIGN PATENT DOCUMENTS

| | | |
|---|---|---|
| AU | 2497399 | 11/1999 |
| AU | 2497499 | 11/1999 |
| AU | 2497599 | 11/1999 |
| AU | 199924973 | 11/1999 |
| AU | 199924974 | 11/1999 |
| AU | 199924975 | 11/1999 |
| AU | 3018500 | 11/2000 |
| AU | 200030185 | 11/2000 |
| EP | 0308224 | 3/1989 |
| EP | 0525363 | 2/1993 |
| EP | 0949596 | 10/1999 |
| EP | 1107196 | 6/2001 |
| EP | 1399897 | 3/2004 |
| GB | 2319381 | 5/1998 |
| GB | 2333879 | 8/1999 |
| GB | 2380687 | 4/2003 |
| JP | 8235276 | 9/1996 |
| JP | 2003132224 | 5/2003 |
| WO | W09215174 A1 | 3/1992 |
| WO | WO9215174 A1 | 3/1992 |
| WO | 9323817 | 11/1993 |
| WO | 9416781 | 8/1994 |
| WO | 9713228 | 4/1997 |
| WO | 9748078 | 12/1997 |
| WO | 9926176 | 5/1999 |
| WO | 9930256 | 6/1999 |
| WO | 9952051 | 10/1999 |
| WO | 9960503 | 11/1999 |
| WO | 0014665 | 3/2000 |
| WO | 0031658 | 6/2000 |
| WO | 0033159 | 6/2000 |
| WO | 0033222 | 6/2000 |
| WO | 0079461 | 12/2000 |
| WO | 0101282 | 1/2001 |
| WO | 0152078 | 7/2001 |
| WO | 0157617 | 8/2001 |
| WO | 0164306 | 9/2001 |
| WO | WO2005006113 | 1/2005 |
| WO | 2005082480 | 9/2005 |
| WO | 2006020413 | 2/2006 |
| WO | 2009094395 | 7/2009 |

OTHER PUBLICATIONS

"Amazon.com and Netflix.com Establish Promotional Relationship for the Sale and Rental of DVD Titles" Business Wire Dec. 4, 1998, 3 pp.

Brook, Valerie. "GM turns up the heat with plan to cross-sell some financial products." Nov. 18, 1994 http://www.americanbanker.com/issues/159__150/-49630-1.html?zkPrintable=true.

"Beneficial, Casual Male Team Up on Card", American Banker. May 4, 1998. http://www.americanbanker.com.

"E-Centives," (http://www.emaginet.com/de...memfaq.shtml), download date: May 23, 1999, 3 pp.

Bloom, Jennifer Kingson. "Wal-Mart on Retail Road Less Traveled: Cobranding," The American Banker Sep. 11, 1998, 'pp.

Elkin, Tobi "Promotions: Mastercard Wins Coveted On-Pack Real Estate in Tie-in with Microsoft" Brandweek Sep. 14, 1998, 1 page.

"Microsoft and First USA Announces $90 Million Online Advertising Alliance" EDP Weekly's IT Monitor Nov. 2, 1998, 2 pp.

Feldman, Amy "Paying with Plastic Not Such a Smart Idea", New York Daily News Nov. 4, 1998, 2 pp.

Cowell, Alan "America's Turn to Colonize; Creditcard Issuers Invade Britain, with U.S. Firepower", The New York Times Nov. 12, 1998, 5 pp.

Armstrong, Larry, "The Free-PC Game: Lure 'Em in and Lock 'Em Up," Business Week, Information Technology, Jul. 19, 1999, 1 pg.

"Shoppers Charge Accounts Co. to Administer Private Label Credit Card for Lew Magram Ltd; Program Marks SCA,s Entry into Retail Catalog/Mail Order Industry" PR Newswire Jun. 29, 1998, 6 pp.

"About Click Rewards." Wired Magazine. http://www.wired.com/wired/subscribe/clickmiles.html, Aug. 20, 2012.

Souccar, Miriam K. "Epidemic of Rate Shopping Spurs a Search for remedies," Jan. 7, 1999, Copyright 1999 American Banker, Inc.

"Wellsparks Group Launches V.I.P. Rewards; The Most Comprehensive Relationship Marketing Program Ever Created by a Mall Developer", Business wire May 19, 1998, 2 pp.

"Jay Jacobs Inc. Introduces Private Label Credit Card", Business Wire May 18, 1998, 1 page.

Meece, Mickey "Big Finance Companies May Want Piece of Limited's Private-Label Card Program", The American Banker Apr. 12, 1995, 2 pp.

"Points Earn Little Credit as Cardholders Fail to Cash in" Birmingham Post May 9, 1998, 2 pp.

"Card Briefs: Beneficial, Casual Male Team Up on Card" The American Banker May 4, 1998 1 pg.

AAdvantage Auction "Experience More with You AAdvantage Miles". http://www.aa.com/il8n/urls/auction.jsp?anchorLocation=DirectURL&title=auction, Aug. 14, 2012.

Wald, Matthew L. "Spending It; Untying Cellular Phones From Those Annual Contracts" The New York Times Mar. 15, 1998, 2 pp.

Wijnen, Renee "Cendant Eyes Cross-Marketing Opportunities; CUC International-HFS Inc. Merger Expected to Yield an Additional 2 Million Club Members" DM News Feb. 2, 1998, 2 pp.

Sanders, Edmund "Tricky Business; The Magic of Rebate Cards can Quickly Disappear", Chicago Tribune Aug. 18, 1997, 3 pp.

Simon, Ruth "Make Sure Your Rebate Card Still Delivers the Goods", Money Aug. 1997, 2 pp.

Selasky, Susan "Easy-To-Swallow Savings; Diner Credit Cards Serve Wide menu of Discounts", Pittsburgh Post-Gazette Dec. 5, 1996, 3 pp.

"Chemical Bank and AT&T Smart Cards form Strategic Alliance", www.att.com/press/1193/931117.blb.html, 3 pp., Aug. 24, 2012.

Kristof, Kathy "Card Sharks are in Season; be Wary of Discounts and Rebates as You Shop Around for Good Credit Deals", Chicago Tribune, Nov. 23, 1993, 2 pp.

Wessel, Harry "Rewarding Experience?; Credit Cards Offering Bonuses Not for Everyone", Chicago Poet-Gazette Dec. 5, 1996, 3 pp.

Ross, Chuck et al., "Coke Card promotion set for '98", (http //adage com/news.sub.—and.sub.—features/features/19971117/article3 html), Copyright Nov. 1997, 2 pp.

Singletary, Michelle, "Electronic World, Unchecked Problem?", The Washington Post, Mar. 4, 1997, Section: Financial, p. C01, 4 pp.

Ellin, Abby, "Listening to an Earful for Savings," (Hear the Pitches and talk for Free), The New York Times, Jan. 24, 1999, 1 pg.
Cox, Beth, "Visa, Travelweb Enter Online Marketing Partnership," Internetnews.com, Jan. 21, 1999, 1 pg.
Tedesco, Richard. "Pactel Pushes Net Access." Broadcasting & Cable. Jun. 3, 1996, pp. 64-65.
Colman, Price. "Cross-marketing Cuts Cable Bills." Broadcasting & Cable. Jul. 15, 1996, p. 44, 2 pp.
O'Brien, Timothy L., "The Market: Market Place—Taking the Danger out of Danger out of Risk; Chase says Models Helped it avoid Financial Minefields," The New York Times Business/Financial Desk, Jan. 20, 1999 Section C. col. 2 at p. 1, 4 pp.
"Rent from NetFlix.com Buy from Amazon.com," Official Press Release, Jan. 17, 1999, 1 pg.
"Let's Play the Cash Register Receipts Lottery", The New York Times, Dec. 25, 1990, Section: Section 1, p. 30, col. 4, Editorial Desk, 1 pg.
Dennis, Sylvia. "Visa Gets ready for Interactive Set-Top Boxes," Newsbytes, Dec. 14, 1998, 2 pp.
"Philips offers customers financing through Citicorp; Philips Medical Systems North America, Citicorp North America Inc." Health Industry Today, Jun. 1991, Section: vol. 54, No. 6, p. 4, ISSN: 0745-4678, 1 page.
Sinclair, Stewart. "To Mail or Not to Mail?" Strategy, Strategy Directresponse Special Report, Couponing, Oct. 12, 1998 at p. D21, 4 pp.
"Winn-Dixie/The Salvation Army Report Contributions for War Against Hunger", PR Newswire, Jun. 10, 1993, Section: Financial News, 1 pg.
Armstrong, Larry. "Coupon Clippers, save Your Scissors," Vons Supermarkets are Revolutionizing the Delivery of Discounts. Business week, Jun. 20, 1994, No. 3377 at p. 164, 2 pp.
Patch, Kimberly, "Sled InterNIC Debut Internet Services; Sled Corp Offers Electronic Coupons for Encryption software; InteNIC Information Services Launches InfoGuide to Internet Computer Network" PC Week, May 16, 1994 vol. 11 No. 19 at p. 130, ISSN: 0740-1604, 1 page.
"American Eagle Outfitters" PR Newswire. Mar. 26, 2010. www.printthis.clickability.com/pt/cpt?expire=
&title=American+Eagle+Outfitters%2C+Inc.+Introduces+the....
Andreoli, Tom et al., "Cash Machines Offer a Whole Lotto Money . . . ", Crain's Chicago Business, Jun. 19, 1995, Section: News, p. 8, 2 pp.
Brochure: "MyPoints (R)", MotivationNet, Inc. (TM), Homepage: www.mypoints.com, Copyright: Apr. 1998, 29 pp.
Bonnici, Joseph et al., "Consumer issues in coupon usage: An exploratory analysis", Journal of Applied Business Research, winter 1996/1997, vol. 13, No. 1, pp. 31-40, ISSNn: 0892-7626, CODEN: JPBEBK, 11 pp.
Hoeschen, Brad. "Brookfield Square Hopes Mall Card Strikes a Chord," Business Journal-Milwaukee, vol. 14, No. 50, p. 19, Sep. 12, 1997, 2 pp.
Armstrong, Larry. "The Free-PC Game: Lure 'Em in and Lock 'Em Up". Jul. 19, 1999 http://www.businessweek.com/1999/99_29/b3638169.htm?scriptFramed.
Iverson, Mark. "DataCard Partners With CSI to Offer Card-Based Loyalty Solution to Merchants." Jul. 19, 1998 http://www.thefreelibrary.com/_print/PrintArticle.aspx?id=20883274.
"Cardbriefs: Stored-Value Card Designed for Casinos", The American Banker, Oct. 31, 1995, Section: Credit/Debit/ATMS, 1 pg.
"Tecmark Reward Terminal", (http //www tecmarkinc com/terminal htm), copyright, 1996 Tecmark Services, Inc., 1 pg.

WAP WTLS: Wireless Application Protocol Wireless Transport Layer Security Specification, Wireless Applications Forum, Limited, Apr. 30, 1998. [Retrieved on Jan. 19, 2009]. Retrieved from the Internet <Oct. 7, 2008>.
Fallon: "UK Retailers Loyal Customer 'Card Wars' Prove costly (Most major retailers in the UK have grown their sales over the past 2 years by lunching loyalty-card program"; Supermarket News, May 5, 1997; vol. 47, No. 18, p. 57.
Booker, Ellis, "Checkout lines to offer more than just candy and waiting", Computer World, May 21, 1990, 1 pg.
Fickenscher, Lisa, "Merchant: American Express Seeks to Mine Its Data on Cardholder Spending Patters", The American Banker, Mar. 24, 1997, Credit/Debit/ATMS, 2 pp.
Fickenscher, Lisa, "Amex to Start Free Rewards Program with Discounts on Merchandise", The American Banker, Oct. 18, 1996, Section: Credit/Debit/ATMS, p. 10, 2 pp.
Fitzgerald, Kate, "Amex program moves loyalty to next level: Custom Extras finds a medium customers can't ignore: Billing Statements", Advertising Age, Nov. 4, 1996, Section: News, 2 pp.
Amato-McCoy, Deena, "Co-Branded Acme Credit Card Rewards Loyal Users" Supermarket News, Jun. 15, 1998, Section: p. 17, ISSN: 0039-5803, 2 pp. "DataCard Partners With CSI to Offer Card-Based Loyalty Solution to Merchants", Business Wire, Jul. 9, 1998, 1 pg.
Albright, Mark, "Grocery savings via Web coupons", St. Petersburg Times, Jul. 22, 1998, Section: Business, 2 pp.
Notice of Allowance; U.S. Appl. No. 13/441,365; Mailing Date Jun. 16, 2012.
Non Final Rejection dated May 4, 2012; U.S. Appl. No. 13/428,656; pp. 1-6.
Notice of Allowance; U.S. Appl. No. 13/428,656; Mailing Date May 15, 2012.
Non Final Rejection dated Mar. 6, 2012; U.S. Appl. No. 13/359,120; pp. 1-7.
Notice of Allowance; U.S. Appl. No. 13/359,120; Mailing Date Apr. 18, 2012.
Non Final Rejection dated Mar. 12, 2012; U.S. Appl. No. 13/359,104; pp. 1-8.
Notice of Allowance; U.S. Appl. No. 13/359,104; Mailing Date Apr. 13, 2012.
Non Final Rejection dated Mar. 6, 2012; U.S. Appl. No. 13/359,080; pp. 1-11.
Notice of Allowance; U.S. Appl. No. 13/359,080; Mailing date Apr. 11, 2012.
Non Final Rejection dated Jan. 10, 2012; U.S. Appl. No. 12/759,506; pp. 1-10.
Notice of Allowance; U.S. Appl. No. 12/759,506; Mail date Mar. 5, 2012.
Non Final Rejection dated Dec. 15, 2012; U.S. Appl. No. 12/720,743; pp. 1-10.
Notice of Allowance; U.S. Appl. No. 12/720,743; Mailing date Jan. 24, 2012.
Non Final Rejection dated May 12, 2009; U.S. Appl. No. 11/420,255; pp. 1-7.
Notice of Allowance; U.S. Appl. No. 11/420,255; Mailing Date Dec. 16, 2009.
Non Final Rejection dated Sep. 6, 2012; U.S. Appl. No. 13/531,904; pp. 1-7.
Notice of Allowance; U.S. Appl. No. 13/531,904; Mailing Date Sep. 19, 2012.
Non Final Rejection dated Sep. 7, 2012; U.S. Appl. No. 13/532,342; pp. 1-6.
Notice of Allowance; U.S. Appl. No. 13/532,342; Mailing Date Sep. 24, 2012.

CONVERSION OF CREDITS TO FUNDS

CROSS-REFERENCE TO RELATED APPLICATIONS

This continuation-in-part application claims the benefit of U.S. patent application Ser. No. 11/420,255 filed 25 May 2006 now U.S. Pat. No. 7,703,673 entitled "Web Based Conversion of Non-Negotiable Credits Associated with an Entity to Entity Independent Negotiable Funds", U.S. patent application Ser. No. 12/720,743 filed 10 Mar. 2010 now U.S. Pat. No. 8,123,127 entitled "Conversion of Non-Negotiable Credits Earned from a Game of Chance to Negotiable Funds", U.S. patent application Ser. No. 12/759,506 filed 13 Apr. 2010 now U.S. Pat. No. 8,162,209 entitled "Storefront Purchases Utilizing Non-Negotiable Credits Earned from a Game of Chance", U.S. patent application Ser. No. 13/168,814 filed 24 Jun. 2011 entitled "Self-Service Stations for Utilizing Non-negotiable Credits Earned from a Game of Chance", U.S. Provisional Patent Application No. 61/595,263 filed 6 Feb. 2012 entitled "Self-Service Station for Utilizing Non-Negotiable Credits Earned from a Game of Chance", U.S. Provisional Patent Application No. 61/595,351 filed Feb. 6, 2012 entitled "Conversion of Non-Negotiable Credits to Negotiable Funds", and U.S. Provisional Application No. 61/595,429 filed Feb. 6, 2012 entitled "Non-Negotiable Credits to Negotiable Funds".

The entire contents of U.S. application Ser. No. 11/420,255, U.S. application Ser. No. 12/720,743, and U.S. application Ser. No. 12/759,506, and U.S. application Ser. No. 13/168,814 are incorporated by reference herein in their entirety.

The entire contents of U.S. Provisional Application No. 61/595,263, U.S. Provisional Application No. 61/595,351 and U.S. Provisional Application No. 61/595,429 are incorporated by reference herein in their entirety.

BACKGROUND

The present invention relates to the field of e-commerce and, more particularly, to the automatic conversion of non-negotiable credits to funds.

Entities often reward consumers for utilizing their services with certain credits. These non-negotiable credits can often be applied towards products and/or services provided by a granting entity or its affiliates. For example, entertainment credits can be redeemed for prizes offered in a winnings storefront of an entertainment site. Many problems are inherent to the current techniques for the redemption of entity provided credits. One such problem is the restriction on usage to goods and/or services of the entity. That is, a consumer may have no need for the products or services listed by the entity for which the non-negotiable credits can be redeemed. Further, additional restrictions and limitations can be placed upon the non-negotiable credits that lessen the usefulness of non-negotiable credits from the consumer's perspective.

Another problem encountered by consumers when redeeming non-negotiable credits is time. Once a consumer submits a request to redeem their non-negotiable credits, the consumer must wait for the entity to perform one or more actions required to fulfill their request. These steps often require days or weeks to complete. Redemption delays can be irritating to all consumers but can be particularly aggravating to e-commerce consumers, who by nature of an e-commerce marketplace expect rapid responses and immediate consumer gratification.

DETAILED DESCRIPTION

Figure 1:
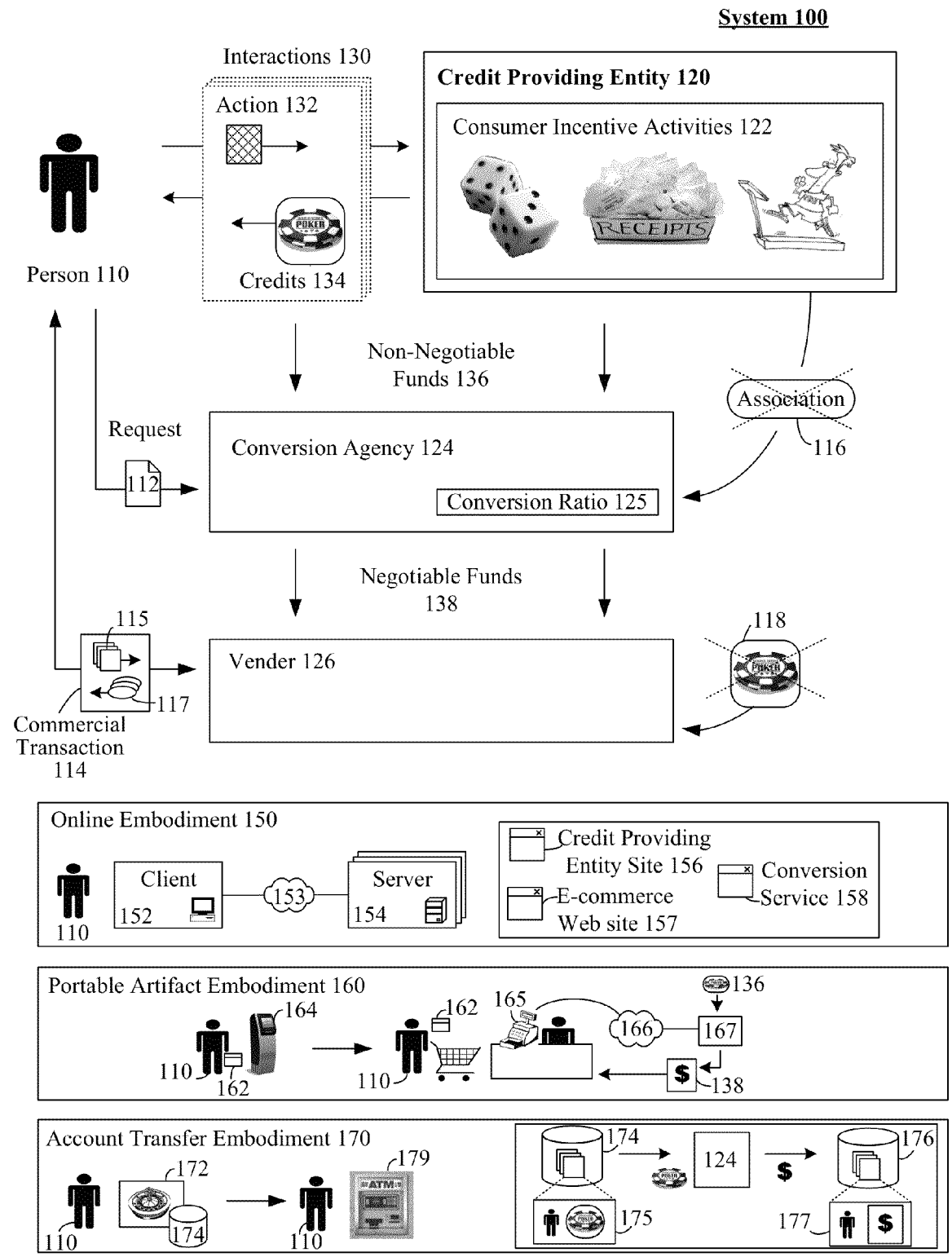
FIG. 1 is a diagram of a system in which non-negotiable funds earned through a variety of actions or anticipated future actions are converted into negotiable funds in accordance with an embodiment of the inventive arrangements disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram of a system 100 in which non-negotiable funds 136 earned from consumer incentive activities 122 are converted into negotiable funds 138 in accordance with an embodiment of the inventive arrangements disclosed herein. In one embodiment, multiple interactions 130 can occur between a person 110 and a credit providing entity 120, in which the person 110 participates in consumer incentive activities 122. During each interaction 130, an action or behavior 132 can be taken. With each successful completion of the consumer incentive activity 122, person 110 can receive credits 134 in the form of non-negotiable funds 136. In one interaction 130, action 132 can be a wager of a game of chance. In this instance, with each non-successful outcome of the game of chance, the person 110 can lose their wager 132.

Other actions 132 for earning credits 134 through interactions 130 with a credit providing entity 120 are contemplated. Such actions can, for example, result in the person 110 earning participation credits, achievement credits, sponsored initiative credits, social networking credits, or even advanced credits in a loan. All of these credits can be earned for a targeted purpose or goal set by the user him or herself or another entity such as a government or corporate entity (e.g., as a sponsored initiative such as a green initiative or a market promotion).

As mentioned, the types of credits 134 are non-negotiable funds 136. These funds 136 (e.g., credits 134) may not be redeemable on an open market. For example, vender 126 will not accept 118 the credits 134 for commercial transactions 114. A conversion agency 124, which is not directly associated 116 with the credit providing entity 120 can convert the non-negotiable funds 136 (which can be a quantity of credits 134) into negotiable funds 138. This conversion can occur in response to a request 112 by person 110.

Person 110 can conduct a commercial transaction 114 with vender 126. During the transaction 114, the person 110 can specify a user-selected set of requests 115 for goods and/or services 117 of the vender 126. The goods and/or services 117 can cost a quantity of negotiable funds 138, which are provided to the vender 126. In one embodiment, the negotiable funds 138 can be provided directly to the vender 126 by the conversion agency 124. In another, the negotiable funds 138 can be provided by the conversion agency 124 to person 110, who provides these funds 138 to the vender 126.

Numerous embodiments exist for conducting the conversions as described herein, a few of which are shown as embodiments 150, 160, and 170. Embodiment 150 shows an online embodiment, where a person 110 can interact (130) with a credit providing entity site 156 to participate in a consumer incentive activity 122. The commercial transactions 114 can be conducted via an e-commerce Web site 157. Additionally, the conversion agency 124 can implement a software based conversion service 158, which performs the conversion of the non-negotiable funds 136 into the negotiable funds 138. The Web sites 156, 157 and service 158 can run within one or more servers 154. These servers 154 can be connected to a client 152 via a network 153, where the client 152 is a computing device that user 110 interacts (130 and/or 114) with.

In one configuration of embodiment 150, the conversion service 158 can be linked to a payment option present in the E-commerce Web site 157, which operates in a manner similar to PAYPAL, GOOGLE CHECKOUT, and the like. That is, a payment option can be presented that permits goods/services of vender 126 to be purchased using (at least in part)

funds 138 converted from credits 134, which were earned from the consumer incentive activities 122.

Embodiment 160 shows a portable artifact embodiment, where a person 110 stores entertainment credits 134 from the game of chance 122 upon a portable artifact 162, which can be a physical card with a magnetic strip, a RFID storage device, a flash memory card, or other tangible artifact able to store digitally encoded (or even analog encoded) data. Machines 164 upon which consumer incentive activities 122 are performed or recorded can include a reader/writer able to alter content stored on the portable artifact 162. Thus, actions 132 outcomes in credits 134 value can be recorded on the artifact 162. The person 110 can thereafter shop at a storefront of vender 126 and present a cashier 164 with the artifact 162. A cash register 165 used by the cashier 164 can be connected to a network 166. The conversion agency 124 can have a network element 168 connected to the network 166, which converts non-negotiable funds 136 on the artifact 162 into a quantity of negotiable funds 138 needed to complete the commercial transaction 114 conducted via the register 165 and cashier 164. From the perspective of the vender 126, the transaction 114 conducted via the register 165 is a "standard" transaction that results in the vender 126 receiving suitable negotiable funds 138 for providing the goods/services 117 to person 110.

Embodiment 170 shows an account transfer embodiment 170, where a person 110 participates in a consumer incentive activity 122 (e.g., in this instance a game of chance 172). Earnings (134, 136) from the consumer incentive activity 122 are recorded within a tangible data store 174 associated with the credit providing entity 120. This data store 174 can include an account 175 for the person 110, which tracks an amount of credits 134, which are non-negotiable funds 136, of the person 110. Conversion agency 124 can directly access the account 175 of data store 174 and can convert a quantity of credits 134 into negotiable funds 138, which are recorded in a tangible data store 176 that is not directly associated with entity 120. The data store 176 can include an account 177 for the person 110, which contains an amount of negotiable funds 138, of the person 110. A person 110 can conduct commercial transactions 114 via a machine 179, such as a kiosk, an ATM machine, etc., which involve funds of account 177 changing. In one embodiment, the goods/services 117 received from person 110 in embodiment 170 can include cash (such as from an ATM machine). This cash can be an amount of cash-back received during transaction 114, can be the transaction 114 itself and may involve a transaction fee, which is extracted from account 177 by machine 179.

The embodiments 150-170 are for illustrative purposes only and are not intended to be (or to be construed as being) exhaustive or comprehensive. For example, any combinations of the embodiments 150, 160, 170 are to be considered within scope of the disclosure. Thus, a consumer incentive activity 122 can be conducted via a Web site 156 (per embodiment 150), where a commercial transaction 114 using the converted entertainment credits 134 per agency 124 can be conducted at a storefront, where a cashier 164 interacts (130) with person 110. In another contemplated configuration, the consumer incentive activity 122 can be conducted with a machine 172 that places credits 134 in account 175 (per embodiment 170), which are converted and used to buy goods/services 117 via an e-commerce Web site 157 (per embodiment 150). In another contemplated configuration, credits can be earned via machine 164 and placed on artifact 162 (per embodiment 160), which can be placed in a machine 179, such as an ATM (per embodiment 170) to extract funds 138, which are converted (by agency 124) from the credits 134 stored on artifact 162.

In one embodiment, the conversion agency 124 can be compensated (e.g., charge a processing fee) for converting the non-negotiable funds 136 to negotiable funds 138. This fee can be paid to conversion agency 124 by the game providing entity 120, the person 110, and/or by the vender 126.

As used herein, consumer incentive activities 122 can be in the form of games, contests, or can occur based on certain consumer behavior, actions or purchases. A game can be structured playing, usually undertaken for enjoyment and sometimes used as an educational tool. A contest can be an event in which at least two teams or individuals compete. There may be an award to a winner or awards for multiple top performers, but a contest may be imposed for training. A contest may occur naturally, or be planned by the participants, rather than organized by another party.

Games are distinct from work, which is usually carried out for remuneration, and from art, which is more often an expression of aesthetic or ideological elements. However, the distinction is not clear-cut, and many games are also considered to be work (such as professional players of spectator sports/games) or art (such as jigsaw puzzles or games involving an artistic layout such as Mahjong, solitaire, or some video games). Key components of games can be goals, rules, challenge, and interaction. Games can generally involve mental or physical stimulation, and often both. Many games help develop practical skills, serve as a form of exercise, or otherwise perform an educational, simulational, or psychological role.

Credit providing entities 120 include any entity providing a consumer with credits based on user behavior, actions, achievements, and the like. Credit providing entities 120 can include corporations such as airlines, hotels, credit card companies, casinos, cruise ships, States (for lottery, scratch off games, etc.), churches, race tracks, online gambling site providers, e-commerce sites, slot-machine houses, carnivals, gambling parlors, companies (for promotional sweepstakes), High Schools (for raffles), and the like.

The action 132 can, in one embodiment, risk money, previously earned credits 134 or something of material value on an event with an uncertain outcome with intent on winning additional money, credits 134, and/or material goods/services. An amount of credits 134 earned from an interaction 130 with a credit providing entity 120 can vary in direct proportion to the user action, behavior, achievement, or the like.

Credits 134 are non-negotiable funds 136 that generally have no value outside of an environment (building, Web site, etc.) of the credit providing entity 120. For example, casinos (one embodiment of entity 120) generally utilize casino tokens, chips, or plaques to represent a quantity of entertainment credits 134. Online gambling sites 156 (and electronic gambling devices) often provide an account to a person 110, where entertainment credits 134 are managed within this account in a computer readable storage medium. In another example, hotel and car rental entities oftentimes afford customers loyalty points that can be redeemed only in future transactions with the hotel or car rental entity itself for certain upgrades or discounts (a form of credits 134). In yet another example, a grocery store may offer consumers a store card to receive special group member discounts to be applied at checkout and additional points for purchases made at the store; for instance, every dollar spent can earn the consumer a point and once the consumer achieves 100 credits in a month timeframe the credits can translate into a 10 cent discount per gallon of gas purchased at a participating gas station.

Use of credits 134, such as casino tokens, rewards points or discounts, can be more convenient than use of negotiable funds 138 for many reasons. For example, use of entertainment credits 134 makes theft and counterfeiting more difficult. Entertainment credits (which when having a physical representation are often a uniform size and weight) can be relatively easy to stack, count, etc. Additionally, studies have proven people (110) engage in consumption more freely (e.g., play games of chance with larger wagers and with greater frequency, or more readily purchase goods and services), when credits 134 are used or applied to the purchase, behavior, or activity, rather cash or other negotiable funds.

Additionally, use of credits 134, can have legal benefits that can permit entities 120 to conduct games of chance 122, which would be prohibited if negotiable funds 138 were utilized instead of entertainment credits 134. That is, numerous legal statutes and regulations exist that are more restrictive when consumer incentive activity earnings are in a form of negotiable funds 138. For example, in the instance that consumer incentive activity 122 is gambling, the Unlawful Internet Gambling Enforcement Act (UIGEA) of 2006 prohibits many online gambling activities with negotiable funds 138, which are permitted with certain forms of non-negotiable funds 136. For example, electronic fund transfers via credit cards or debit cards related to gambling winnings are generally prohibited by US banks. Similarly, wire transfers of negotiable funds 138 earned through gambling are legally prohibited in many instances. Many of these acts explicitly prohibit the transfer of negotiable funds from gambling earnings across state lines Non-negotiable funds 136 can include any of a variety of financial instruments that are not legal currency and not governed under article 3 of the Uniform Commercial Code (UCC). For example, non-negotiable funds 136 can include IOUs issued by the credit providing entity 120. In one embodiment, non-negotiable funds 136 can include secured transactions, which take a security interest on collateral owned by the credit providing entity's 120 assets, which are subject to Article 9 of the UCC. In one embodiment, the non-negotiable funds 136 can include letters of credit, issued by the credit providing entity 120.

Negotiable funds 138 comprise a set of negotiable instruments, which are a specialized type of "contract" for the payment of money that is unconditional and capable of transfer by negotiation. As payment of money is promised later, the instrument itself can be used by the holder in due course frequently as money. Common examples include checks, banknotes (paper money), and commercial paper. Thus, negotiable funds 138 include currency, and instruments covered by Article 3 and 4 of the Uniform Commercial Code. For a writing to be a negotiable instrument under Article 3,[1] the following requirements must be met: 1) The promise or order to pay must be unconditional; 2) The payment must be a specific sum of money, although interest may be added to the sum; 3) The payment must be made on demand or at a definite time; 4) The instrument must not require the person promising payment to perform any act other than paying the money specified; 5) The instrument must be payable to bearer or to order. Additionally, negotiable funds include commercial paper, letters of credit (governed by Article 5 of the UCC), Bills of lading (governed by Article 7 of the UCC), securities (governed under Article 8 of the UCC), and deeds and other documents. One important consideration for many negotiable instruments (funds 138) is that they are payable to a bearer on demand.

The commercial transaction 114 can be one in which wherein the quantity of negotiable funds 138 are applied to user (110) specified (via request 115, for example) purchase of a good or service 117. Stated differently, a commercial transaction can be an economic transaction where person 110 receives a good or a service from vender 126 for value. Commercial transactions 114 can include a sale goods (117) from a storefront, a Web site, a catalog (mail order), over the phone, and the like. Transaction 114 can also include a payment for a service requested by person 110. Payment of the negotiable funds 138 during the commercial transaction 114 can occur before, after, or concurrent with the receipt (or shipping) of the goods or service 117. A contract (including specifics established by the parties (110 and 126) as well as legal defaults provided by the UCC or applicable common law/state law) between the vender 126 and person 110 established as part of the commercial transaction 114 can determine when payment (funds 138) for the goods/services 117 is due. In one embodiment, commercial transaction 114 can include transaction where currency is provided to person 110 by a vender 126 (a bank as part of an ATM transaction, for example) for a fee. This currency can be provided as a loan or as a withdrawal from an account of person 110, where the account includes the negotiable funds 138.

The conversion agency 124 can be a legal entity that converts non-negotiable funds 136 (including credits 134) into negotiable funds 138. The conversion agency 124 can lack a direct association 116 with the credit providing entity 120. In one embodiment, no legal relationship of enablement of corporate identity (no parent, subsidiary, etc.) relationship can exist between the conversion agency 124 and entity 120. No fiduciary duties under corporate law can exist between agency 124 and game providing entity 120. In one embodiment, agency 124 can be geographically located outside property owned or leased by the game providing entity 120. In another, it can lease space and provide its services from entity 120 owned/leased land. In one embodiment, the conversion agency 124 can support multiple different credit providing entities 120, which can be competitors of each other.

In one embodiment, the conversion agency 124 is not a bank or similar financial institution (and may therefore be outside the guidelines established by UIGEA and other statues and regulations, which impose restrictions on banks). In one embodiment, the conversion agency 124 may be located in the same jurisdiction as the credit providing entity (possibly to avoid legal entanglements/restrictions with operating in multiple or across jurisdictional boundaries) or may be located in a jurisdiction with favorable rules for performing the fund conversions.

In one embodiment, the conversion agency can be tasked with establishing and maintaining a conversion ratio 125. In another embodiment, it should be noted that the credit providing entity 120 can also predetermine a conversion ratio 125 for credits 134 that will govern the conversion of non-negotiable credits 136 to negotiable funds 138. In either embodiment, the conversion agency 124 will utilize conversion rate 125 in calculations associated with converting non-negotiable funds 136 to negotiable funds 138. The conversion ratio 125 can, in one embodiment act like a conventional exchange rate in that it defines the rate at which one currency (the credits 134) will be exchanged for another (negotiable funds 138). It can also be regarded as the value of one market's currency (credit market) in terms of another currency (real-world negotiable funds market).

In the retail currency exchange market, a different buying rate and selling rate can usually be quoted by money dealers. As referred to herein, the buying rate is the rate at which conversion agencies accept non-negotiable funds 136 for conversion to negotiable funds, and the selling rate can be the rate at which conversion agency 124 or other such entity as well as credit providing entities 120 can advance credits to person 110 for future actions 132. The quoted rates can incorporate an allowance for a conversion agency's margin (or profit) in trading, or else the margin may be recovered in the form of a "commission" or in some other way.

It should be noted that different rates 125 may also be quoted for different types of non-negotiable funds (e.g., casino chips, loyalty rewards point, and the like). In one embodiment, conversion ratio 125 can be a market based exchange rate and thus can change whenever the values of either of the two component currencies change. The market for non-negotiable funds 136 to negotiable funds 138 exchange can be influenced by times of year and special occasions (such as Christmas, the New Year celebrations, Valentine's Day, high travel season, and the like) to affect conversions of certain types of credits 134 based non-negotiable funds 136 to negotiable funds 138. In another embodiment, the conversion ratio 125 can be a fixed exchange rate, also known as a pegged exchange rate, which is a type of exchange rate regime wherein a currency's value is matched to the value of another single currency. The conversion ratio 125 in this instance does not fluctuate but is consistent and steady.

Figure 2:
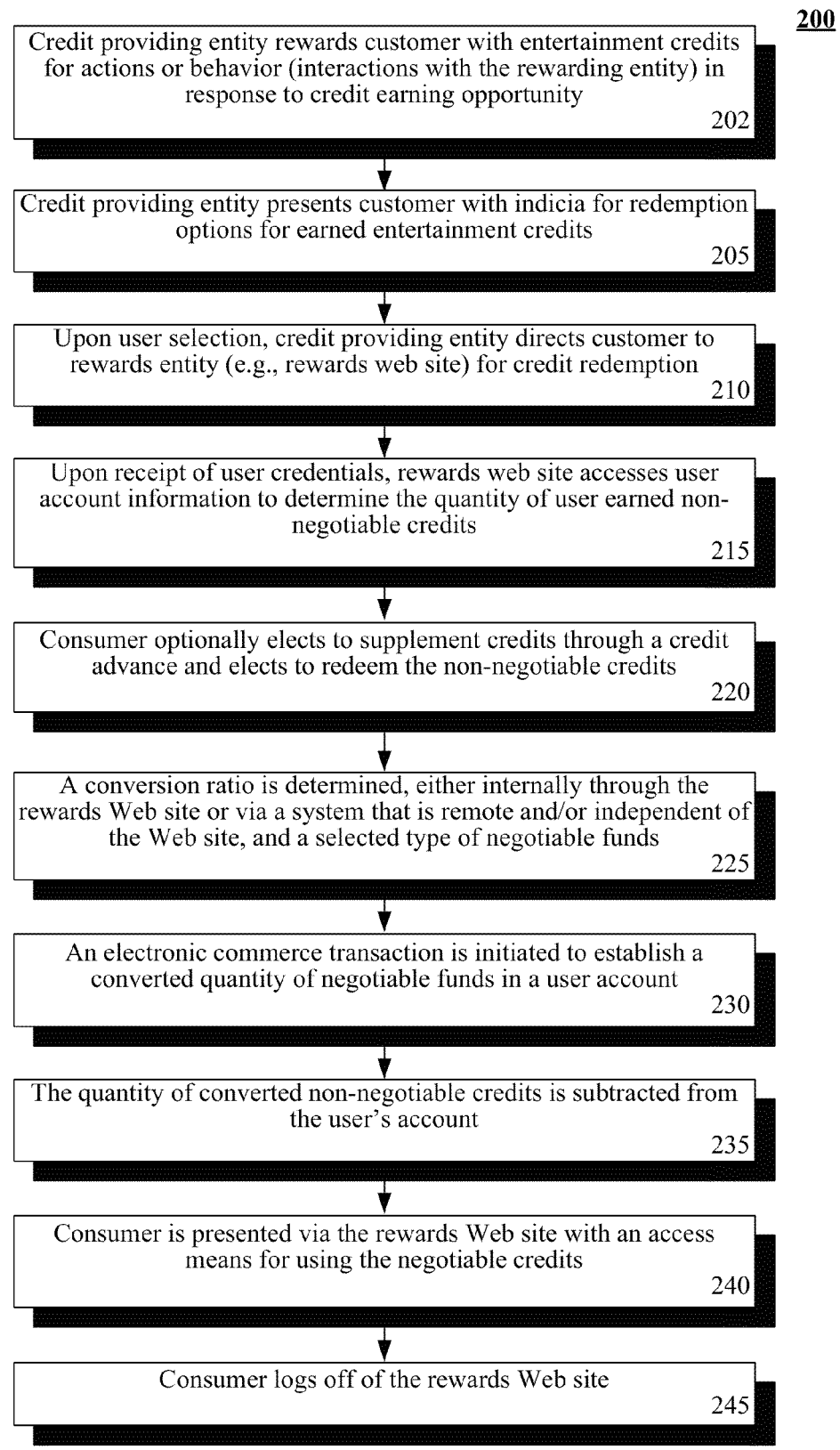
FIG. 2 is a flow chart of a method for the Web based granting and conversion of non-negotiable credits to negotiable funds in accordance with an embodiment of the inventive arrangements disclosed herein.

FIG. 2 is a flow chart of a method 200 for the Web based granting and conversion of non-negotiable credits to negotiable funds in accordance with an embodiment of the inventive arrangements disclosed herein. Method 200 can in one embodiment comprise steps 202 to 245. However, the following description of one embodiment of method 200 is not intended to be construed as limiting as other or additional steps for an entity granting a consumer entertainment credits and presenting indicia leading to credit redemption are contemplated.

Method 200 can begin in step 202, where the credit providing entity can reward a customer with entertainment credits for actions or behavior (or promised future actions or behavior) undertaken by the customer in response to a credit earning opportunity. In step 205, the credit providing entity can present a customer with indicia for redemption options for the customer earned entertainment credits. Indicia can be in the form of banners, radio buttons, pop-up windows, embedded links, audio and or video notification, QR or bar codes, flyers, and the like.

Upon user selection of the indicia advertised redemption option(s), the credit providing entity can in step 210 direct the customer to one or more rewards entities (e.g., a rewards web site) for credit redemption. In step 215, the rewards Web site utilizes user credentials provided by, for example, the credit providing entity of the customer or the customer him or herself to access the consumer's account information and determine the amount of non-negotiable credits in the consumer's account. The consumer optionally selects to supplement his or her available credits by engaging in a credit advance and elects to redeem some quantity of non-negotiable credits in step 220. If supported by the rewards Web site, the consumer can additionally select the form of negotiable funds to convert the non-negotiable credits.

In step 225, a ratio is determined for the conversion of the non-negotiable credits to the selected type of negotiable funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 230 to establish the converted amount of negotiable funds in a user account. The quantity of converted non-negotiable credits is subtracted from the user's account in step 235. In step 240, the rewards Web site presents the consumer with an access means for the negotiable funds. Lastly, the consumer terminates the session by logging off the rewards Web site in step 245.

Figure 3:
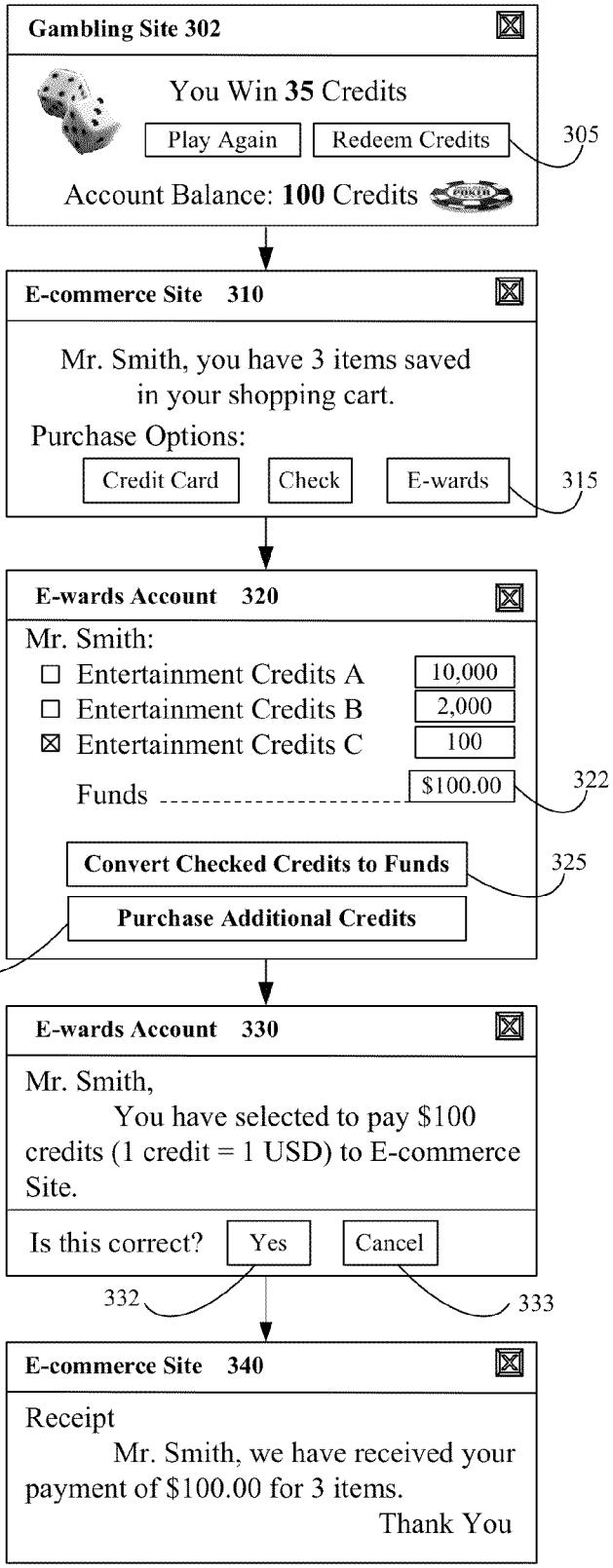
FIG. 3 is a depiction of successive GUIs that illustrate a web based credit granting event with credit redemption indicia and subsequent conversion of non-negotiable funds into negotiable funds in accordance with an embodiment of the inventive arrangements disclosed herein.

FIG. 3 is a depiction 300 of successive GUIs that illustrate a web based credit granting event with credit redemption indicia and subsequent conversion of non-negotiable funds into negotiable funds in accordance with an embodiment of the inventive arrangements disclosed herein.

GUI 302 shows an interface from a gambling Web site. A quantity of entertainment credits are earned on this site, which can be later converted by a conversion agency for use in buying/selling items from a vender, who does not accept the entertainment credits. The gambling Web site or credit providing entity website can include options to "play again" (i.e., repeat the credit earning behavior to potentially earn additional non-negotiable entertainment credits) and an indicia 305 for credit redemption opportunities. The indicia can be presented to a customer via a variety of means including but not limited to, banners, radio buttons, pop-up windows, embedded links, audio and or video notification, QR or bar codes, flyers, and the like.

GUI 310 can be a checkout window from an e-commerce site. GUI 310 includes payment button 315, which represents a payment option that includes the conversion of non-negotiable credits to purchase the items in the shopping cart. Selection of payment button 315 by a user can produce GUI 320.

GUI 320 can be a display window from a conversion agency. GUI 320 includes display box 322 and buttons 325, 327. GUI 320 can be rendered by any of a variety of means including, but not limited to, a Web browser, a JAVA applet, a PERL script, and the like. In one embodiment, GUI 320 can be contained within the e-commerce site. GUI 320 can display the balance of non-negotiable, entertainment credits earned from one or more game providing entities. GUI 320 contains a means by which the user selects the type of non-negotiable credits to convert including, but not limited to, a set of radio buttons, a set of checkboxes, a highlighting mechanism, and the like. Display box 322 can display the monetary value of the selected non-negotiable credits. The value displayed in display box 322 can be based on preset conversion factors.

Button 325 can represent the initiation of the process by which the selected non-negotiable credits are converted to negotiable funds. Button 327 can allow a user to purchase additional entertainment credits at predetermined exchange rates or engage in a credit advance when the option is available to the customer. For example, a credit account holder may wish to engage in a loan policy for credits in exchange for a guarantee of future acts or behavior that would earn him or her non-negotiable credits. The credit loan is a policy that can take advantage of a credit account holder's lack of impulse control in regards to purchasing behavior by allowing a user to immediately purchase a desired good or purchase but delay payment until a later time. In another embodiment, the credit advance or loan can be an immediate purchase of non-negotiable credits with negotiable funds to supplement earned entertainment credits. Selection of button 325 by a user can produce GUI 330.

GUI 330 can be a display window from a conversion agency. GUI 330 includes yes button 332 and cancel button 333. GUI 330 can be rendered by any of a variety of means including, but not limited to, a Web browser, a JAVA applet, a PERL script, and the like. In one embodiment, GUI 330 can be contained within the e-commerce site. GUI 330 can display a summary message of the transaction initiated by GUI 320. GUI 330 can include a means to continue the transaction, yes button 332, and a means to cancel the transaction, cancel button 333. Selection of cancel button 333 by a user cancels the transaction and can return the user to GUI 320. Selection of yes button 332 by a user completes the transaction initiated in GUI 320 and can produce GUI 340.

GUI 340 can be a display window from the same said e-commerce site. GUI 340 can contain a message acknowledging the successful conversion of the user's non-negotiable credits into negotiable funds for the purchase of the items in the shopping cart.

Figure 4:
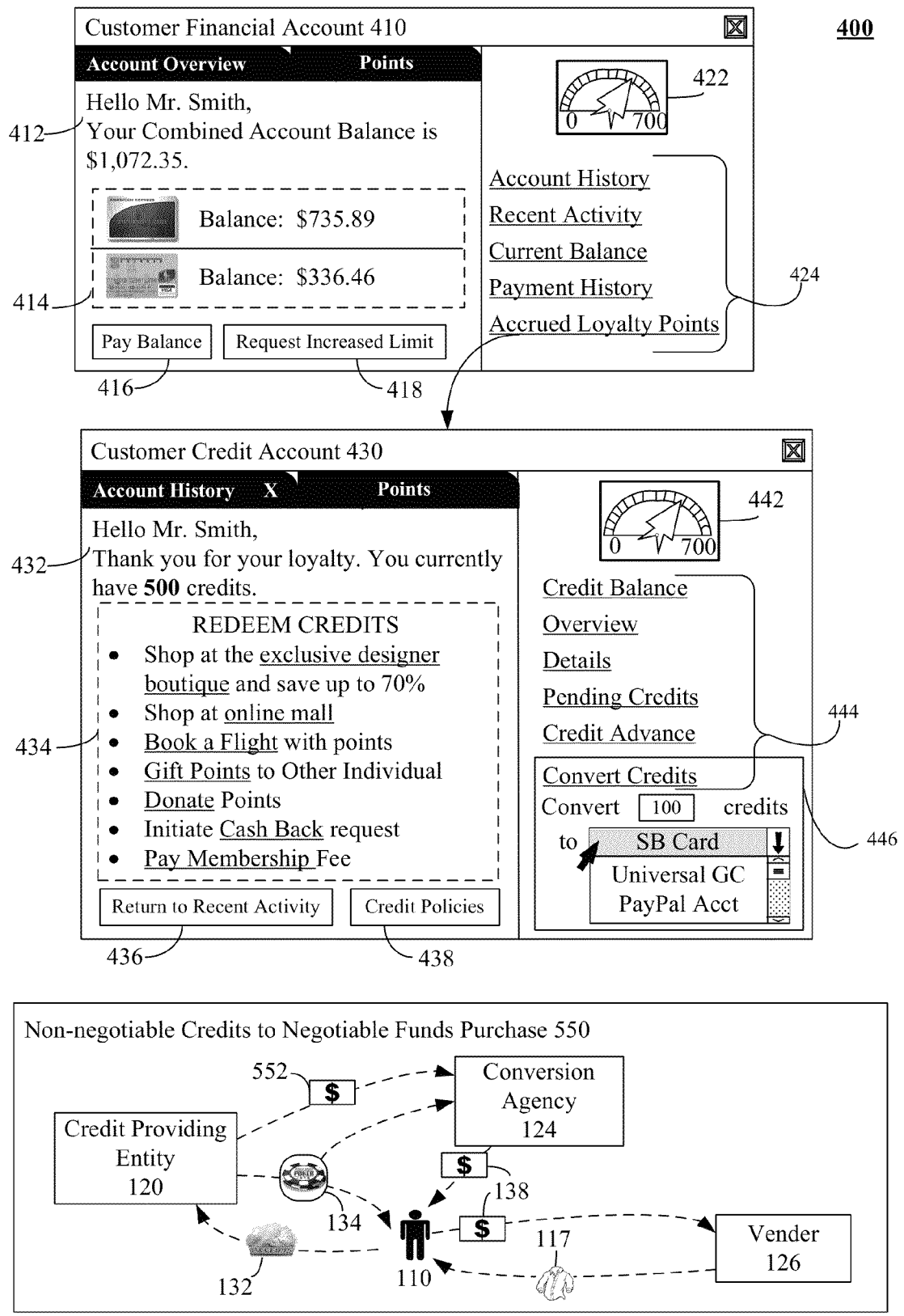
FIG. 4 is a depiction of a scenario and a set of GUIs for granting entertainment credits and presenting indicia for conversion opportunities of the non-negotiable funds earned by a consumer through interactions with the credit granting entity into negotiable funds in accordance with an embodiment of the inventive arrangements disclosed herein.

FIG. 4 is a depiction 400 of a scenario 450 and a set of GUIs 410, 430 for granting entertainment credits and presenting indicia for conversion opportunities of the non-negotiable funds earned by a consumer through interactions with the credit granting entity into negotiable funds in accordance with an embodiment of the inventive arrangements disclosed herein.

Customer financial account 410 can include a user prompt 412 that can present the customer with his or her summary information, a user account overview 414, buttons for typical options such as pay balance 416 and request increased limit 418, credit indicator 422, and account navigation options 424. User account overview 414 can present the customer with one or more financial account types for the customer. Each account can be eligible for loyalty point accrual through a variety of options.

For example, user account type one could be eligible for a fixed 5 points per transaction credit reward and card two could allow varying levels of point accrual for different types of transactions (e.g., five point per dollar spent for automotive expenses, 3 points per dollar spent for travel and restaurants, and 1 point per dollar for all other purchases). Credit indicator 422 can provide the customer with a visual display of the number of loyalty points he or she has accrued to date and selecting the point specific account navigation option 424 can launch customer credit account GUI 430.

Customer credit account 430 GUI can include summary 432, redemption options 434, buttons for navigation such as a button to return to recent activity 436 (for example, GUI 410), and credit account specific navigation options 444, including an option to convert credits 446 to other payment artifacts (for example, transferring converted funds to a customer's PAYPAL account, or an entity specific gift card). Summary 432 can present the customer with an overview of the total balance of points earned to date (which can be visually seen via indicator 422.

Redemption option indicator 434 can present the customer with a selection of or all available options for spending his or her accrued loyalty points. Such options can include, but are not limited to, shopping at an exclusive discount designer boutique, an online mall, booking a flight with points, gifting points to another individual or donating points to an organization or cause, initiating a cash-back request based on a specified conversion ratio, paying a membership or subscription fee with points, and the like. It should be understood that each of these redemption options can be subject to a differing conversion rate set by either the conversion agency 124 or credit granting entity 120.

Scenario 550 depicts one viable scenario for a non-negotiable credits to negotiable funds purchase which can include interactions between a user 110, credit providing entity 120, conversion agency 124 and vender 126. It should be noted that the separate entities are not affiliated with one another and can be separate legal entities. User 110 can engage in a consumer incentive activity 132 provided by credit providing entity 120 which in turn provides user 110 with credits 134 as a reward for engaging in the sponsored activity. The non-negotiable credits 134 can be passed onto the conversion agency 124 upon a user request or a user initiation of a purchase with credits.

In one embodiment conversion agency 124 can be compensated for their services by the credit providing entity through compensation payment 552. In another embodiment, conversion agency 124 can build in compensation for their services through a processing or handling fee passed onto the user 110. Conversion agency 124 can then provide the user with access to negotiable funds 138 to be utilized in the user initiated transaction with vender 126. Vender 126, upon receipt of payment 138, can provide the user 110 with his or her desired good or service purchased.

Figure 5:
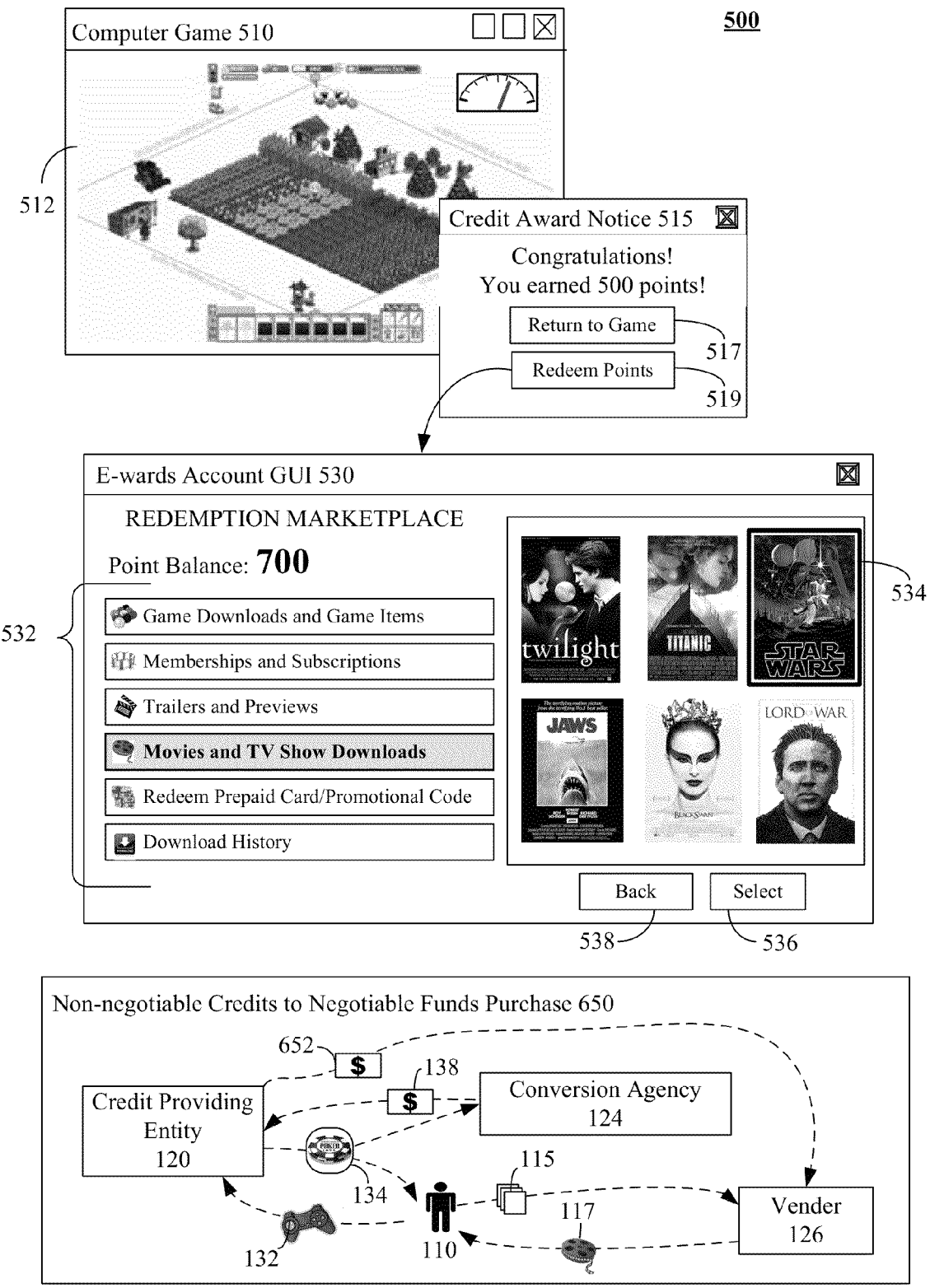
FIG. 5 is a depiction of a scenario and a set of GUIs for granting entertainment credits and directing a consumer to conversion opportunities of the non-negotiable funds earned by the consumer through a game of chance with the credit granting entity into negotiable funds in accordance with an embodiment of the inventive arrangements disclosed herein.

FIG. 5 is a depiction 500 of a scenario 550 and a set of GUIs 510, 530 for granting entertainment credits and directing a consumer to conversion opportunities of the non-negotiable funds earned by the consumer through a game of chance with the credit granting entity into negotiable funds in accordance with an embodiment of the inventive arrangements disclosed herein.

Computer game 510 (accessed, for example, through a social networking site, online multiplayer games, etc.) can allow a user to accrue points or non-negotiable credits through a variety of options such as reaching certain levels, obtaining certain statuses, succeeding in a variety of user collaboration scenarios, and the like. When a user is awarded points a credit award notice 515 can inform the user that he or she has successfully completed a challenge or milestone and has been rewarded a number of entertainment credits. Credit award notice can include buttons for returning to the game 517 and continue accruing points and redeeming points 519. Should a user elect to redeem his or her points immediately, e-wards account GUI 530 can be launched.

E-wards account GUI 530 (e.g., redemption marketplace) can indicate a total user point balance, redemption options 532, and a browsing interface for selection 534, as well as include buttons to select 536 an option, and a back 538 button. Redemption options 532 can include, but are not limited to, game downloads and game items, memberships and subscriptions, trailers and previews, movies and TV show downloads, redeeming prepaid cards or promotional codes and viewing a user download or redemption history. Game downloads and game items can include a new game, special levels opening up upon a user reaching a certain level or completing a certain action in a game, an option to purchase upgrades to user equipment or game achievements, and the like. Memberships and subscriptions can include gym memberships, magazine or newspaper subscriptions, and the like. Other options and components for credit redemption are contemplated.

Non-negotiable credits to negotiable funds purchase scenario 650 can include interactions between a user 110, credit providing entity 120, conversion agency 124, and vender 126. User 110 can engage in game of chance 132 with credit providing entity 120 in exchange for non-negotiable credits 134. Non-negotiable credits 134 can then be passed on to conversion agency 124 for conversion to negotiable funds when requested by user 110 and can be returned to credit providing entity 120 for holding in a user account to be utilized on behalf of user 110 when requested.

Upon user 110 initiating a purchase with vender 126 through a request 115, credit providing entity 120 can provide vender 126 with negotiable funds 652 prompting vender 126 to provide user 110 with goods or services 117 (for example, a video download or streaming rental). In this instance, vender 126 does not accept non-negotiable credits 134 as payment and negotiable funds 652 are provided seamlessly so vender 126 is not aware of user 110 having paid in earned non-negotiable credits 134.

Figure 6:
FIG. 6 is a depiction of a scenario and a set of GUIs for granting entertainment credits and directing conversion opportunities of the non-negotiable funds earned by a consumer through a gambling activity with the credit granting entity into negotiable funds in accordance with an embodiment of the inventive arrangements disclosed herein.
Figure 6:
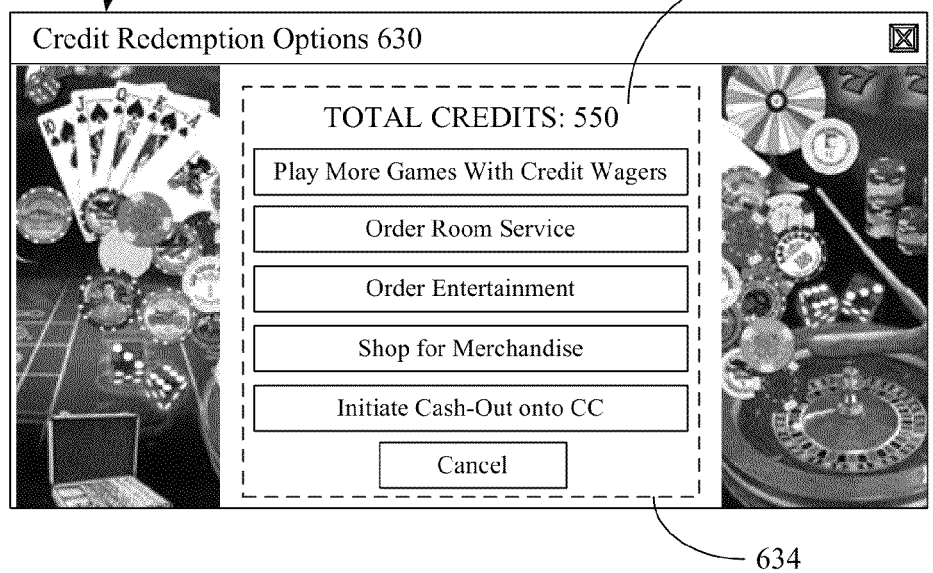
Figure 6:
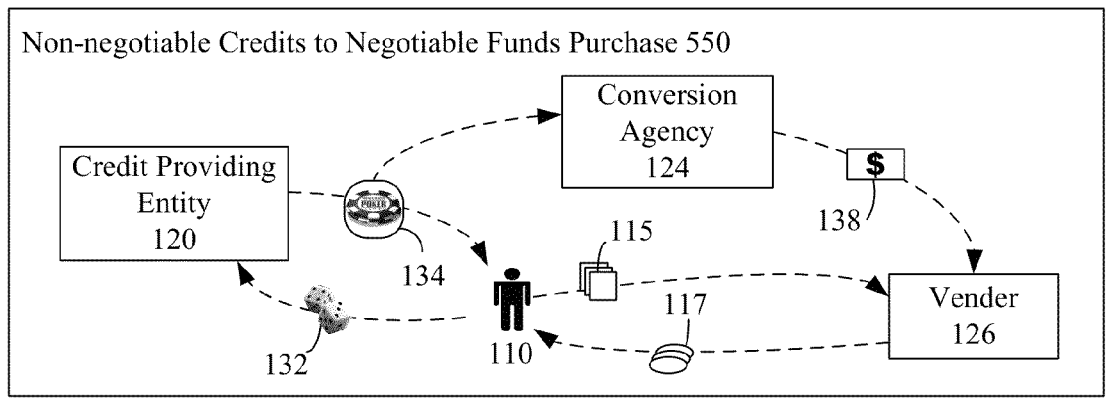

FIG. 6 is a depiction 600 of a scenario 650 and a set of GUIs 610, 630 for granting entertainment credits and directing conversion opportunities of the non-negotiable funds earned by a consumer through a gambling activity with the credit granting entity into negotiable funds in accordance with an embodiment of the inventive arrangements disclosed herein.

Gambling website 610 can provide an online gambling opportunity 612 for customers where customers can earn points or non-negotiable credits in exchange for wining a gambling game. The number of credits earned can depend on the specific wager or odds or be fixed to a set amount per play. Upon successful completion (i.e., a win) of gambling game 612, gambling website 610 can present the customer with notice 614 informing the customer of the number of credits he or she has won. In addition, gambling website 610 can present the user with an indicia button 616 to redeem points or an option to play again 618.

User selection of the redeem points button 616 can launch credit redemption options 630 GUI. Credit redemption GUI 630 can present a customer with his or her total credit balance 632 as well as credit redemption options 634. Redemption options 634 in this instance can include options to play more games with credit wagers, order room service in a casino hotel room when available, order in room entertainment such as movies or TV shows or even purchasing tickets to events, shopping for merchandise or initiating cash-out to a credit card or other payment artifact. An option to cancel and return to the game is also included.

Non-negotiable credits to negotiable funds purchase scenario 550 can include interactions between user 110, credit providing entity 120, conversion agency 124 and vender 126. In this embodiment's scenario, user 110 can play a gambling game 132 hosted by credit providing entity 120, which in turn can reward user 110 with non-negotiable credits 134 for participating in the gambling game. Non-negotiable credits 134 can be passed on to conversion agency 124 for conversion to non-negotiable funds 138 upon user initiation 115 of a transaction with vender 126. The conversion agency 124 can then upon conversion of non-negotiable credits 134 to negotiable funds 138 pass on the negotiable funds 138 to vender 126 as payment for the user requested goods/services 117. The vender can be unaware the funds are being transferred through the conversion agency 124 and thus from the vender's perspective the transaction is a regular transaction.

Figure 7:
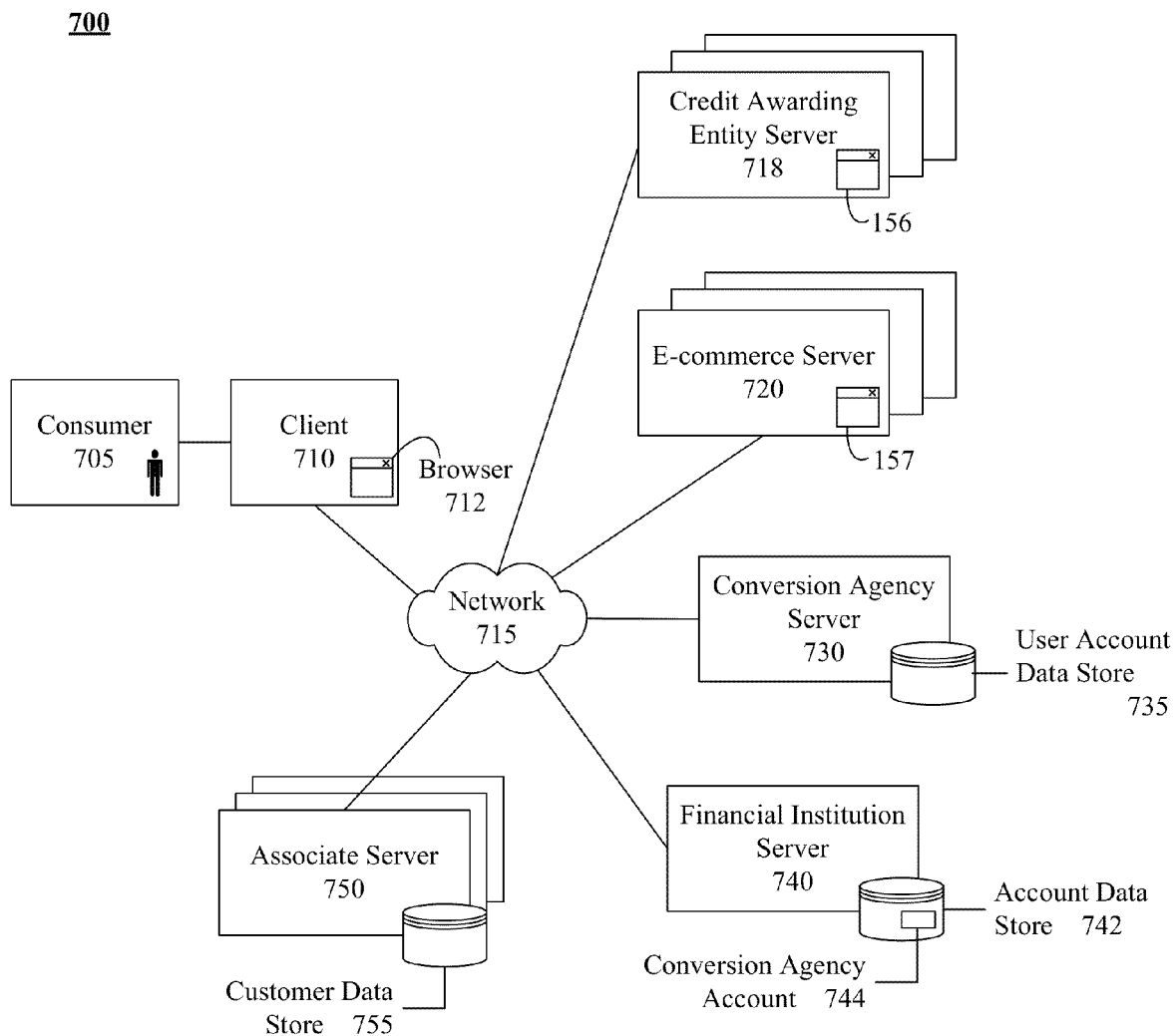
FIG. 7 is a schematic diagram of system for converting non-negotiable credits associated with a game providing entity to negotiable funds in accordance with an embodiment of the inventive arrangements disclosed herein.

FIG. 7 is a schematic diagram of system 700 for converting non-negotiable credits associated with a credit providing entity to negotiable funds in accordance with an embodiment of the inventive arrangements disclosed herein. System 700 can represent a specific embodiment of system 100.

In system 700, consumer 705 can interact with a game of chance server 718, such as through a Web site 156 that server 718 provides. Interactions can occur via a browser 712, rich internet interface, or other software executing upon client 710. Consumer 705 can purchase goods/services from an e-commerce Web site 157 provided by e-commerce server 720. These goods/services can be purchased using negotiable funds that a conversion agency server 730 provides. The conversion agency server 730 can convert entertainment credits resulting from earnings of a game of chance (non-negotiable funds) into the negotiable funds.

Client 710 can be any of a variety of devices including, but not limited to, a personal computer, a kiosk, a telephone, a personal data assistant (PDA), a mobile phone, and the like. Client 710 can include hardware, such as a processor, a memory, and a bus connecting them (as can server 718, 720, 730, 740, and/or 750). The hardware can execute computer program products (software/firmware) that is stored in a non-transitory storage medium. In one embodiment, client 710 can operate in a stand-alone fashion. Alternatively, client 710 can be a device that cooperatively participates in a network of distributed computing devices. Network 715 can facilitate data exchanges over wireless as well as line-based communication pathways and protocols.

In one embodiment, consumer 705 and conversion agency server 730 can interact with associate server 750, e-commerce server 720, and/or financial institution server 740 via network 715. Conversion agency server 730 includes user account data store 735 in which consumer 705 is a member. Associate server 750 includes customer data store 755 in which consumer 705 is a member. Financial institution server 740 includes account data store 742. Account data store 742 includes conversion agency account 744 corresponding to conversion agency 730.

Consumer 705 can earn non-negotiable credits from games provided by server 718. These earnings (non-negotiable credits) can be managed by associate server 750. The quantity of these non-negotiable credits can be saved in customer data store 755. Consumer 705 can use conversion agency server 730 to convert the non-negotiable credits from associate server 750 into negotiable funds provided to the e-commerce server 720 or financial institution 740. In one embodiment, conversion agency 730 can maintain multiple accounts for the consumer 705. These different accounts can be associated with different game providing entities, and with different types of non-negotiable credits.

For example, consumer 705 can earn 500 credits from participating in an online game hosted by server 718. Consumer 705 can choose to use conversion agency 730 to convert any or all of these credits to a monetary equivalent. Conversion agency 730 withdraws the necessary amount from conversion agency account 744 contained within the account data store 742 of financial institution 740 and transfers it to an account specified by consumer 705. In another example, consumer 705 uses conversion agency 730 to complete a purchase at e-commerce server 720. Again, conversion agency 730 withdraws the necessary amount from conversion agency account 744 contained within the account data store 742 of financial institution 740 and transfers it to the account of e-commerce server 720.

E-commerce server 720 can provide a Web site that supports online purchases of goods or services. In one embodiment, e-commerce server 720 can include a distinct payment option for conversion agency 730. This distinct payment option could process the conversion of credits through their Web site. Alternatively, the distinct payment option could launch an application to process the conversion of credit that is separate from their Web site. In another embodiment, associate server 750 can act as e-commerce server 720. In one embodiment, e-commerce server 720 can provide a software service (or can execute a software module) that permits the sale of goods or services, without necessarily providing a Web site. Further, e-commerce server 720 can be directly replaced with back-end system of a storefront server, serving the same relative functions as described in system 700 of facilitating the sales of goods/services.

Financial institution server 740 can be any of a variety of entities including, but not limited to, a bank, a credit card company, an investment firm, and the like. In one embodiment, financial institution server 740 can reside in the same country as consumer 705 associate server 750, and/or game of chance server 718. In another embodiment, financial institution server 740 can reside in a country other than that of consumer 705 and/or associate server 750.

As shown herein, data stores 755, 735, 742, 176, 174, and the like can be physically implemented within any type of hardware including, but not limited to, a magnetic disk, an optical disk, a semiconductor memory, a digitally encoded plastic memory, a holographic memory, or any other recording medium. Each of the data stores 755, 735, 742, 176, 174 can be stand-alone storage units as well as a storage unit formed from a plurality of physical devices, which may be remotely located from one another. Additionally, information can be stored within each data store 755, 735, 742, 176, 174 in a variety of manners. For example, information can be stored within a database structure or can be stored within one or more files of a file storage system, where each file may or may not be indexed for information searching purposes.

The network 715 can include any hardware/software/firmware necessary to convey digital content encoded within carrier waves. Content can be contained within analog or digital signals and conveyed through data or voice channels and can be conveyed over a personal area network (PAN), a local area network (LAN), or a wide area network (WAN). The network 715 can include local components and data pathways necessary for communications to be exchanged among computing device components and between integrated device components and peripheral devices. The network 715 can also include network equipment, such as routers, data lines, hubs, and intermediary servers which together form a packet-based network, such as the Internet or an intranet. The network 715 can further include circuit-based communication components and mobile communication components, such as telephony switches, modems, cellular communication towers, and the like. The network 715 can include line based and/or wireless communication pathways.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   at least one of one or more computers establishing an account for non-negotiable credits provided by an entity to one or more users;
   at least one of the one or more computers detecting a set of two or more interactions between the entity and at least one of the one or more users, each of the interactions earning a quantity of non-negotiable credits, wherein the earned quantities of non-negotiable credits for each of the interactions are added to the account; and
   at least one of the one or more computers subtracting a quantity of the non-negotiable credits from the account, said subtracted quantity of non-negotiable credits corresponding to a quantity of negotiable funds or a quantity of entity independent funds in accordance with a conversion rate established during a conversion operation for converting the non-negotiable credits to negotiable funds or entity independent funds, wherein the quantity of negotiable funds or entity independent funds resulting from the conversion operation are able to be applied to one or more purchases with at least one commerce partner that accepts the negotiable funds or the entity independent funds for purchases but does not directly accept the non-negotiable credits for purchases.

2. The method of claim 1, wherein the one or more computers is one computer.

3. The method of claim 1, wherein the one or more computers is a plurality of computers, wherein different ones of the plurality of computers perform different ones of the establishing of the account, the detecting of the set of interactions, and the subtracting of the non-negotiable credits.

4. The method of claim 1, wherein the conversion operation is performed by a different entity than the entity.

5. The method of claim 1, wherein the conversion ratio is established and maintained by the entity, which is based on an amount of compensation the entity will pay for consumption of the subtracted quantity of the non-negotiable credits.

6. The method of claim 1, wherein the non-negotiable credits are loyalty points for a loyalty program or rewards program provided by the entity to the one or more users.

7. The method of claim 1, wherein the subtracted quantity of the non-negotiable credits corresponds to the quantity of negotiable funds, and wherein the conversion operation is for converting the non-negotiable credits to the negotiable funds.

8. The method of claim 1, wherein the subtracted quantity of the non-negotiable credits corresponds to the quantity of entity-independent funds, and wherein the conversion operation is for converting the non-negotiable credits to the entity independent funds.

9. The method of claim 8, wherein the entity independent funds are loyalty points for a loyalty program or rewards program provided by the commerce partner to the one or more users.

10. The method of claim 1, wherein the one or more purchases with the at least one commerce partner are for virtual goods provided by the one or more commerce partner.

11. The method of claim 1, wherein the non-negotiable credits are winnings earned from risking a user selected quantity of negotiable funds or non-negotiable credits while playing a game, said game having an element of chance or skill upon which receiving the winnings depend.

12. The method of claim 1, wherein the non-negotiable credits are earned through use of a payment artifact provided by the entity.

13. The method of claim 1, wherein the entity expressly disclaims liability from usages of the negotiable funds or the entity independent funds resulting from the conversion operation.

14. The method of claim 1, wherein the entity expressly indicates that the non-negotiable credits have no cash value.

15. The method of claim 1, wherein the non-negotiable credits have restrictions on use, wherein the restrictions on use result in the at least one commerce partner not directly accepting the non-negotiable credits for purchases in absence of the conversion operation.

16. The method of claim 1, further comprising:
the entity providing the one or more users with one or more credit earning customer incentive activities, wherein upon successful completion of the one or more credit earning customer incentive activities by one of the one or more users, the entity grants the one or more users at least a sub quantity of the quantity of non-negotiable credits, wherein the providing of the credit earning customer incentive activities occurs through at least one of the one or more computers.

17. The method of claim 1, further compressing:
the entity presenting at least one of the one or more users with indicia to inform the at least one of the one or more users of opportunities for redeeming the earned quantity of non-negotiable credits with the at least one commerce partner, said opportunities requiring the conversion operation, wherein the presenting of the indicia occurs through at least one of the one or more computers.

18. The method of claim 1, further comprising:
at least one of the one or more computers granting the one or more users the quantity of non-negotiable credits in response to the one or more users interacting with the entity.

19. The method of claim 1, further comprising:
at least one of the one or more computers indicating a conversion of the non-negotiable credits to the negotiable funds or to the entity independent funds, wherein the conversion operation is performed in a manner consisted with the indicated conversion.

20. The method of claim 1, wherein said conversion operation occurs substantially concurrently with one of said interactions.

21. The method of claim 1, wherein said conversion operation occurs substantially concurrently with one of said purchases.

22. The method of claim 1, wherein said conversion operation creates negotiable funds to be applied to one or more prior purchases.

23. The method of claim 1, wherein said conversion operation creates negotiable funds to be applied to one or more prior interactions.

24. The method of claim 1, wherein the set of two or more interactions are commercial transactions occurring using a payment artifact provided by the entity, wherein the entity compensates the commerce partner for purchases made by the one or more users with the payment artifact, wherein at least one of the one or more users reimburse the entity for the one or more purchases made with the payment artifact after the purchases occur, wherein the reimbursement comprises the at least one of the one or more users redeeming the non-negotiable credits with the entity in lieu of reimbursing the entity with negotiable funds for the purchases previously made with the at least one commerce partner using the payment artifact.

25. A method comprising:
one or more computers granting one or more users a quantity of non-negotiable credits in response to the one or more users interacting with an entity providing the non-negotiable credits; and
at least one of the one or more computers indicating a conversion of the non-negotiable credits to entity independent funds, wherein the entity expressly disclaims liability from usages of the entity independent funds resulting from the conversion, wherein the entity explicitly indicates that the provided non-negotiable credits have no cash value, wherein the entity independent funds are able to be directly used for purchasing goods or services via a storefront, wherein the storefront does not permit direct usage of the non-negotiable credits for the purchasing of goods or services.

26. The method of claim 25, wherein the indicating of the conversion comprises at least one of the one or more computers subtracting a quantity of the non-negotiable credits maintained in a non-negotiable credit account in exchange for a quantity of entity independent funds being made available for the purchase, wherein the subtracted quantity of the non-negotiable credits and the quantity of entity independent credits are based on an established conversion ratio for converting the non-negotiable credits into the entity-independent funds, wherein the one or more users are charged zero or more non-negotiable credits, entity-independent funds, or negotiable credits for converting the non-negotiable credits into the entity-independent funds.

27. The method of claim 25, further comprising:
presenting a message to the one or more users, said message notifying the one or more users that the non-negotiable credits are able to be converted into the entity independent funds for purchases for which the non-negotiable credits are not able to be directly used.

28. The method of claim 25, wherein each of the one or more computers comprise one or more computer-readable, tangible storage devices and computer-readable program instructions which are stored on the one or more storage devices, wherein execution of the computer-readable program instructions result in one or more of the computers granting the one or more users the quantity of non-negotiable credits and result in indicating the conversion of the non-negotiable credits to the entity independent funds.

29. The method of claim 25, wherein a single one of the one or more computers grants the one or more users the quantity of non-negotiable credits and indicates the conversion of the non-negotiable credits to the entity independent funds.

30. The method of claim 25, wherein the conversion of non-negotiable funds to entity-independent funds is performed by a conversion agency, wherein the conversion agency is a different legal entity than the entity.

31. The method of claim 25, wherein the one or more users compensate the entity for the conversion of non-negotiable credits to entity-independent funds, said compensation being an amount in negotiable funds.

32. The method of claim 25, wherein the non-negotiable credits are loyalty points for a loyalty program or rewards program provided by the entity to the one or more users.

33. The method of claim 25, wherein the non-negotiable credits are earned through completing commercial transactions with the entity or are earned through use of a payment artifact provided by the entity.

34. The method of claim 25, wherein the non-negotiable credits are winnings earned from risking a user selected quantity of negotiable funds or non-negotiable credits while playing the game, said game having an element of chance or skill upon which receiving the winnings depend.

35. The method of claim 25, wherein the non-negotiable credits are rewards for a frequency with which a user plays a game provided by the entity.

36. The method of claim 25, wherein the storefront is an electronic or on-line storefront.

37. A method comprising:
   a credit providing entity providing one or more customers with one or more credit earning customer incentive activities, wherein upon successful completion of the one or more credit earning customer incentive activities by a customer, the activity providing entity grants the customer a quantity of non-negotiable credits; and
   the non-negotiable credit providing entity presenting the customer with indicia to inform the customer of opportunities for redeeming the earned quantity of non-negotiable credits on purchases with one or more venders that are different legal entity than the credit providing entity, wherein the credit providing entity asserts that the granted non-negotiable credits have no cash value, and wherein the one or more venders redeem the non-negotiable credits, which were received from the customer for purchases, with the credit providing entity as part of a previously established agreement between the one or more venders and the credit providing entity, wherein at least one of the providing of the credit earning customer incentive activities and the presenting of the indicia to inform the customer about opportunities for redeeming is performed by a computer executing program instructions stored in a memory.

38. The method of claim 37, further comprising:
   a server of the credit providing entity directing the customer to the one or more selected non-negotiable credit redemption options upon customer selection of the presented indicia within a user interface of a local computer connected to the server, wherein the server provides renderable content presented in the user interface.

39. The method of claim 37, wherein the purchases between the customer and the one or more venders are online shopping purchases.

40. The method of claim 37, wherein the credit earning consumer incentive activity is a game of chance.

41. The method of claim 37, wherein the credit earning consumer incentive activity is an online computer game.

42. The method of claim 37, wherein the successful completion of the one or more incentive activities comprises the customer winning a game of chance.

43. The method of claim 37, wherein the purchases with the one or more venders are for virtual goods provided by the one or more venders.

44. A computer program product comprising:
   one or more non-transitory computer-readable mediums;
   program instructions, stored on at least one of the one or more non-transitory computer-readable mediums, to establish an account for non-negotiable credits provided by an entity to one or more users;
   program instructions, stored on at least one of the one or more non-transitory computer-readable mediums, to detect a set of two or more interactions between the entity and at least one of the one or more users, each of the interactions earning a quantity of non-negotiable credits, wherein the earned quantities of non-negotiable credits for each of the interactions are added to the account; and
   program instructions, stored on at least one of the one or more non-transitory computer-readable mediums, to subtract a quantity of the non-negotiable credits from the account, said subtracted quantity of non-negotiable credits corresponding to a quantity of negotiable funds or a quantity of entity independent funds in accordance with a conversion rate established during a conversion operation for converting the non-negotiable credits to negotiable funds or entity independent funds, wherein the quantity of negotiable funds or entity independent funds resulting from the conversion operation are able to be applied to one or more purchases with at least one commerce partner that accepts the negotiable funds or the entity independent funds for purchases but does not directly accept the non-negotiable credits for purchases.

45. A computer program product comprising:
   one or more non-transitory computer-readable mediums;
   program instructions, stored on at least one of the one or more non-transitory computer-readable mediums, to grant one or more users a quantity of non-negotiable credits in response to the one or more users interacting with an entity providing the non-negotiable credits; and
   program instructions, stored on at least one of the one or more non-transitory computer-readable mediums, to indicate a conversion of the non-negotiable credits to entity independent funds, wherein the entity expressly disclaims liability from usages of the entity independent funds resulting from the conversion, wherein the entity explicitly indicates that the provided non-negotiable credits have no cash value, wherein the entity independent funds are able to be directly used for purchasing goods or services via a storefront, wherein the storefront does not permit direct usage of the non-negotiable credits for the purchasing of goods or services.

46. The computer program product of claim 45, wherein the program instructions to indicate the conversion comprises program instructions to subtract a quantity of the non-negotiable credits maintained in a non-negotiable credit account in exchange for a quantity of entity independent funds being made available for the purchase, wherein the subtracted quantity of the non-negotiable credits and the quantity of entity independent credits are based on an established conversion ratio for converting the non-negotiable credits into the entity-independent funds, wherein the one or more users are charged zero or more non-negotiable credits, entity-independent funds, or negotiable credits for converting the non-negotiable credits into the entity-independent funds.

47. The computer program product of claim 45, wherein the non-negotiable credits are loyalty points for a loyalty program or rewards program provided by the entity to the one or more users.

48. A computer program product comprising:
   one or more non-transitory computer-readable mediums;
   program instructions, stored on at least one of the one or more non-transitory computer-readable mediums, to provide one or more customers with one or more credit earning customer incentive activities, wherein upon successful completion of the one or more credit earning customer incentive activities by a customer, the activity providing entity grants the customer a quantity of non-negotiable credits; and program instructions, stored on at least one of the one or more non-transitory computer-readable mediums, to present the customer with indicia to inform the customer of opportunities for redeeming the earned quantity of non-negotiable credits on purchases with one or more venders that are different legal entity than a credit providing entity, wherein the credit providing entity asserts that the granted non-negotiable credits have no cash value, and wherein the one or more venders redeem the non-negotiable credits, which were received from the customer for purchases, with the credit providing entity as part of a previously established agreement between the one or more venders and the credit providing entity, wherein at least one of the providing of the credit earning customer incentive activities and the presenting of the indicia to inform the customer about opportunities for redeeming is performed by a computer executing program instructions stored in a memory.

49. The computer program product of claim 48, further comprising:

program instructions, stored on at least one of the one or more non-transitory computer-readable mediums, to direct the customer to the one or more selected non-negotiable credit redemption options upon customer selection of the presented indicia within a user interface of a local computer connected to a server of a credit providing entity, wherein the server provides renderable content presented in the user interface.

50. The computer program product of claim 48, wherein the purchases with the one or more venders are for virtual goods provided by the one or more venders.

* * * * *